(12) United States Patent
Haddad et al.

(10) Patent No.: US 12,527,669 B2
(45) Date of Patent: Jan. 20, 2026

(54) MULTIAXIAL MODULAR TIBIA STEMS

(71) Applicant: WRIGHT MEDICAL TECHNOLOGY, INC., Memphis, TN (US)

(72) Inventors: Steven L. Haddad, Glenview, IL (US); Gary W. Lowery, Eads, TN (US); Jesse G. Moore, Germantown, TN (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 1031 days.

(21) Appl. No.: 17/649,088

(22) Filed: Jan. 27, 2022

(65) Prior Publication Data

US 2022/0280307 A1   Sep. 8, 2022

Related U.S. Application Data

(60) Provisional application No. 63/193,280, filed on May 26, 2021, provisional application No. 63/156,452, filed on Mar. 4, 2021.

(51) Int. Cl.
 *A61F 2/42* (2006.01)
 *A61F 2/30* (2006.01)

(52) U.S. Cl.
 CPC .. *A61F 2/4202* (2013.01); *A61F 2002/30108* (2013.01); *A61F 2002/30621* (2013.01); *A61F 2002/4205* (2013.01)

(58) Field of Classification Search
 CPC ........... A61F 2/4202; A61F 2002/4205; A61B 17/7266; A61B 17/7258
 See application file for complete search history.

(56) References Cited

U.S. PATENT DOCUMENTS

| | | |
|---|---|---|
| 1,090,881 A | 3/1914 | Rowley |
| 3,708,883 A | 1/1973 | Flander |
| 3,839,742 A | 10/1974 | Link |
| 3,872,519 A | 3/1975 | Giannestras et al. |
| 3,886,599 A | 6/1975 | Schlein |
| 3,987,500 A | 10/1976 | Schlein |
| 4,011,602 A | 3/1977 | Rybicki et al. |
| 4,021,864 A | 5/1977 | Waugh |
| 4,069,518 A | 1/1978 | Groth, Jr. et al. |
| 4,149,277 A | 4/1979 | Bokros |

(Continued)

FOREIGN PATENT DOCUMENTS

| | | |
|---|---|---|
| EP | 0385930 A1 | 9/1990 |
| EP | 0864305 A1 | 9/1998 |

(Continued)

OTHER PUBLICATIONS

Orthopedic Designs North America, Inc., "TalonTM Distal FixTM Femoral Nail System", http://odi-na.com/?service=talon-distalfix-femoral-nail-system, 4 pages, Jan. 2022.

(Continued)

*Primary Examiner* — Brian A Dukert
(74) *Attorney, Agent, or Firm* — DUANE MORRIS LLP

(57) ABSTRACT

Provided are tibia stem components of ankle replacement prosthesis that are designed to engage dense tibia bone to reduce implant migration over long term.

32 Claims, 48 Drawing Sheets

(56) References Cited

U.S. PATENT DOCUMENTS

| | | |
|---|---|---|
| 4,450,591 A | 5/1984 | Rappaport |
| 4,467,801 A | 8/1984 | Whiteside |
| 4,470,158 A | 9/1984 | Pappas et al. |
| 4,474,177 A | 10/1984 | Whiteside |
| 4,644,943 A | 2/1987 | Thompson et al. |
| 4,840,632 A | 6/1989 | Kampner |
| 4,878,917 A | 11/1989 | Kranz et al. |
| 4,968,316 A | 11/1990 | Hergenroeder |
| 5,207,678 A | 5/1993 | Harms et al. |
| 5,207,712 A | 5/1993 | Cohen |
| 5,330,481 A | 7/1994 | Hood et al. |
| 5,342,368 A | 8/1994 | Petersen |
| 5,360,450 A | 11/1994 | Giannini |
| 5,582,189 A | 12/1996 | Pannozzo |
| 5,720,766 A | 2/1998 | Zang et al. |
| 5,766,259 A | 6/1998 | Sammarco |
| 5,824,106 A | 10/1998 | Fournol |
| 5,827,289 A | 10/1998 | Reiley et al. |
| 5,866,113 A | 2/1999 | Hendriks et al. |
| 5,947,893 A | 9/1999 | Agrawal et al. |
| 6,183,519 B1 | 2/2001 | Bonnin et al. |
| 6,197,029 B1 | 3/2001 | Fujimori et al. |
| 6,280,442 B1 | 8/2001 | Barker et al. |
| 6,579,293 B1 | 6/2003 | Chandran |
| 6,589,281 B2 | 7/2003 | Hyde, Jr. |
| 6,663,669 B1 | 12/2003 | Reiley |
| 6,673,116 B2 | 1/2004 | Reiley |
| 6,783,548 B2 | 8/2004 | Hyde, Jr. |
| 6,860,902 B2 | 3/2005 | Reiley |
| 6,875,236 B2 | 4/2005 | Reiley |
| 6,939,380 B2 | 9/2005 | Guzman |
| 7,323,012 B1 | 1/2008 | Stone |
| 7,410,488 B2 | 8/2008 | Janna et al. |
| 8,034,114 B2 | 10/2011 | Reiley |
| 8,211,107 B2 | 7/2012 | Parks et al. |
| 8,496,712 B2 | 7/2013 | Reiley |
| 8,715,362 B2 * | 5/2014 | Reiley .................... A61B 17/15 623/23.44 |
| 8,876,821 B2 | 11/2014 | Kinmon |
| 9,629,726 B2 | 4/2017 | Reiley et al. |
| 9,629,730 B2 | 4/2017 | Reiley |
| 9,827,025 B2 * | 11/2017 | Jansen ............... A61B 17/7266 |
| 10,743,999 B2 | 8/2020 | Reiley |
| 2002/0055744 A1 | 5/2002 | Reiley |
| 2003/0097131 A1 | 5/2003 | Schon et al. |
| 2005/0107791 A1 | 5/2005 | Manderson |
| 2005/0288792 A1 | 12/2005 | Landes et al. |
| 2006/0200151 A1 | 9/2006 | Ducharme et al. |
| 2006/0229730 A1 | 10/2006 | Reiley |
| 2007/0150065 A1 | 6/2007 | Angibaud |
| 2007/0173954 A1 | 7/2007 | Lavi |
| 2007/0288097 A1 | 12/2007 | Hurowitz |
| 2008/0015587 A1 | 1/2008 | Munoz |
| 2008/0200957 A1 | 8/2008 | Marcacci et al. |
| 2009/0082818 A1 | 3/2009 | Roth |
| 2009/0149861 A1 | 6/2009 | Brodsky et al. |
| 2012/0010719 A1 | 1/2012 | Reiley |
| 2016/0051369 A1 | 2/2016 | Sander |
| 2016/0338841 A1 | 11/2016 | Sander |
| 2017/0079798 A1 | 3/2017 | Peter |
| 2017/0143387 A1 | 5/2017 | Jansen |
| 2020/0015978 A1 | 1/2020 | Harris |
| 2020/0246154 A1 | 8/2020 | Nachtrab et al. |

FOREIGN PATENT DOCUMENTS

| | | |
|---|---|---|
| EP | 1666006 | 7/2006 |
| EP | 1774926 | 4/2007 |
| FR | 2220235 A1 | 10/1974 |
| FR | 2543821 A3 | 10/1984 |
| FR | 2615726 A1 | 12/1988 |
| FR | 2680968 A1 | 3/1993 |
| FR | 2700462 A1 | 7/1994 |
| JP | 2000093435 A | 4/2000 |
| JP | 2009515610 A | 4/2009 |
| WO | WO 01/30264 | 5/2001 |

OTHER PUBLICATIONS

Arthrex, "Foot and Anke—Intramedullary Nails," https://www.arthrex.com/foot-ankle/intramedullary-nails, 4 pages, Jan. 2022.

Zimmer Biomet, "ROI-C® Cervical Cage with VerteBridge® Plating Technology", https://www.zimmerbiomet.com/medical-professionals/spine/product/roi-c-cervical-cage.html, 6 pages, Jan. 2022.

PCT ISR for PCT/US2008/080111, Jun. 18, 2009.

Extended European Search Report issued in connection with corresponding Patent Application No. 22158465.9, Aug. 4, 2022, 6 pages.

First Office Action issued in connection with Japanese Patent Application No. 2022-023207, May 9, 2023, 11 pages.

Extended European Search Report issued in connection with corresponding European Patent Application No. 23180097.0, Jan. 25, 2024, 9 pages.

* cited by examiner

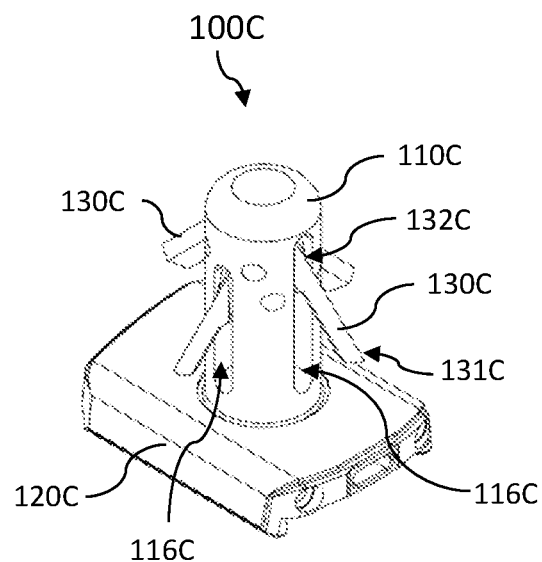
FIG. 3D
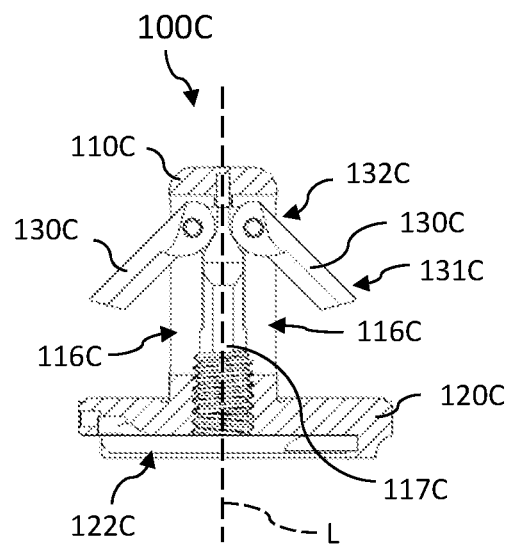 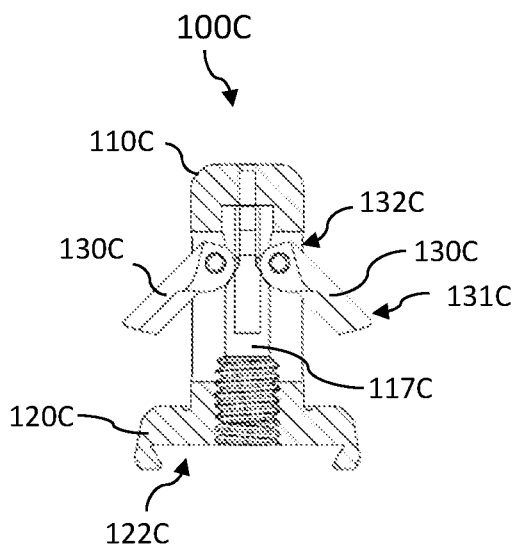
FIG. 3E    FIG. 3F

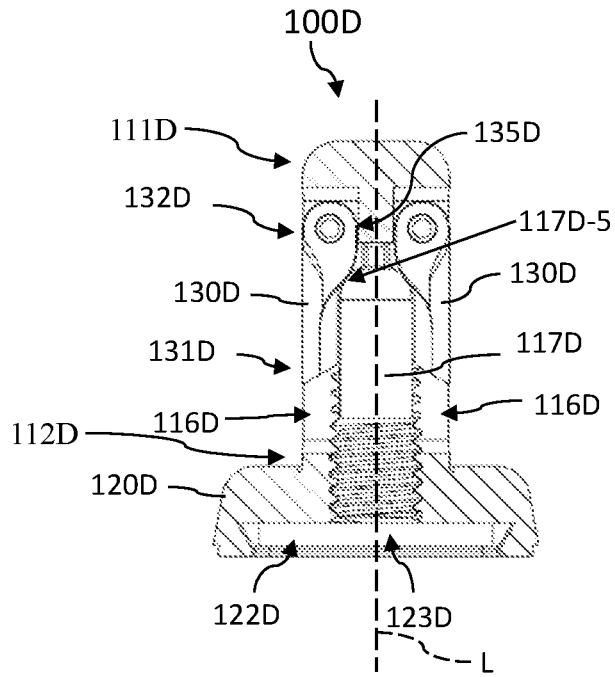
FIG. 4C
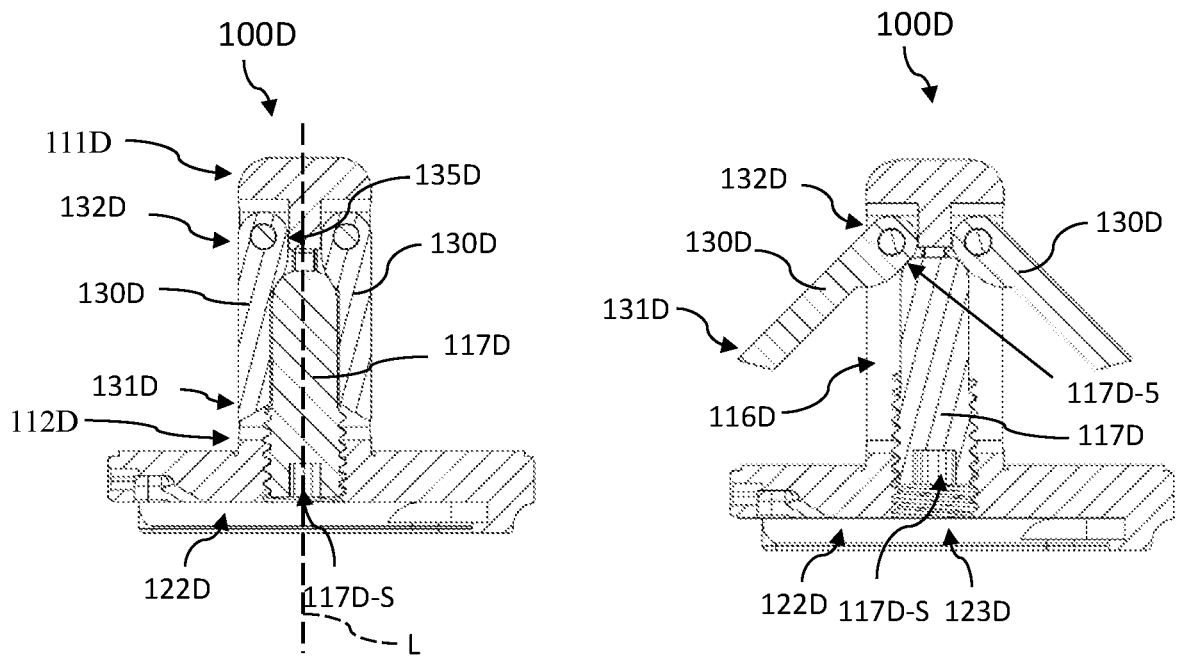
FIG. 4D
FIG. 4E

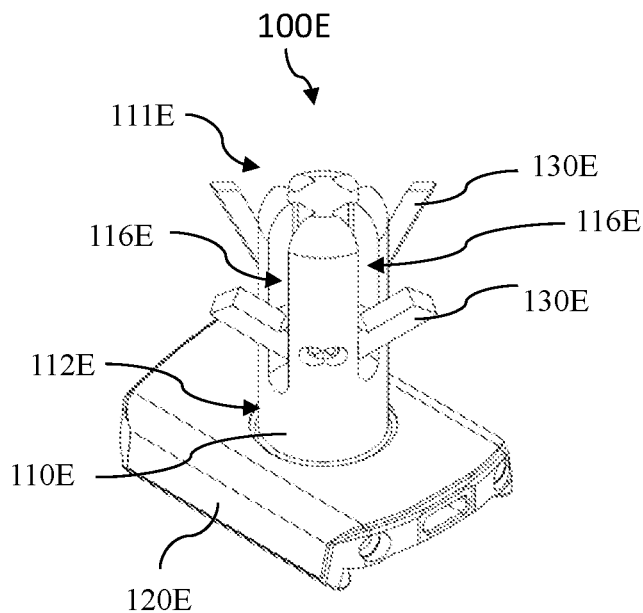
FIG. 5C
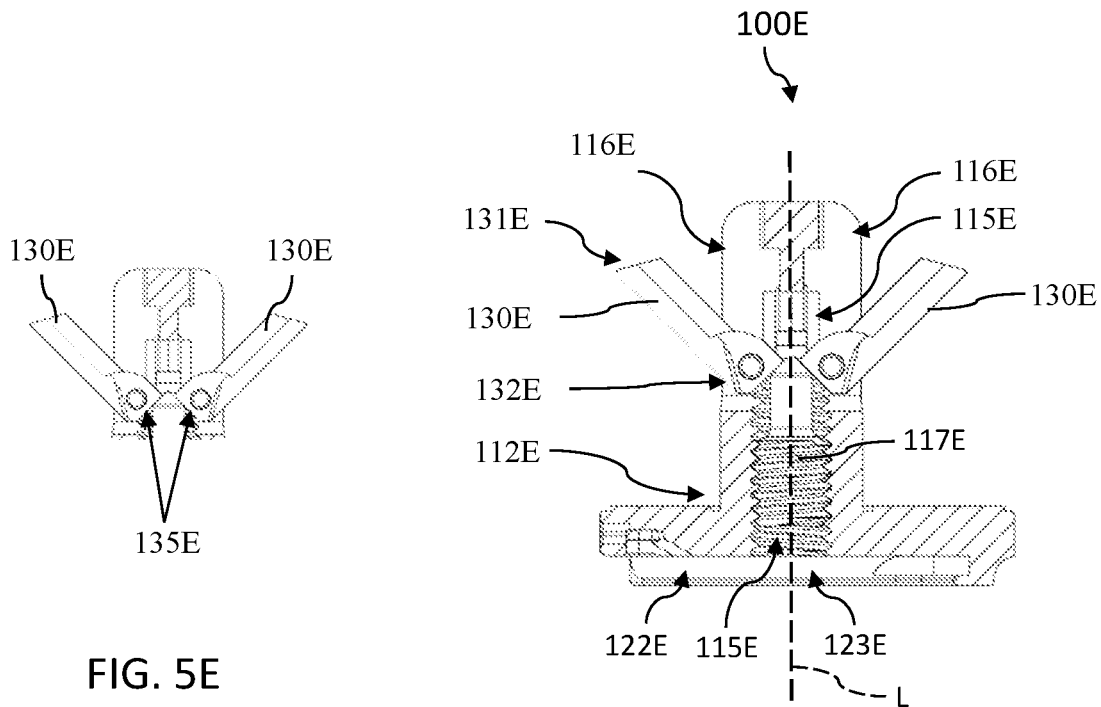
FIG. 5E
FIG. 5D

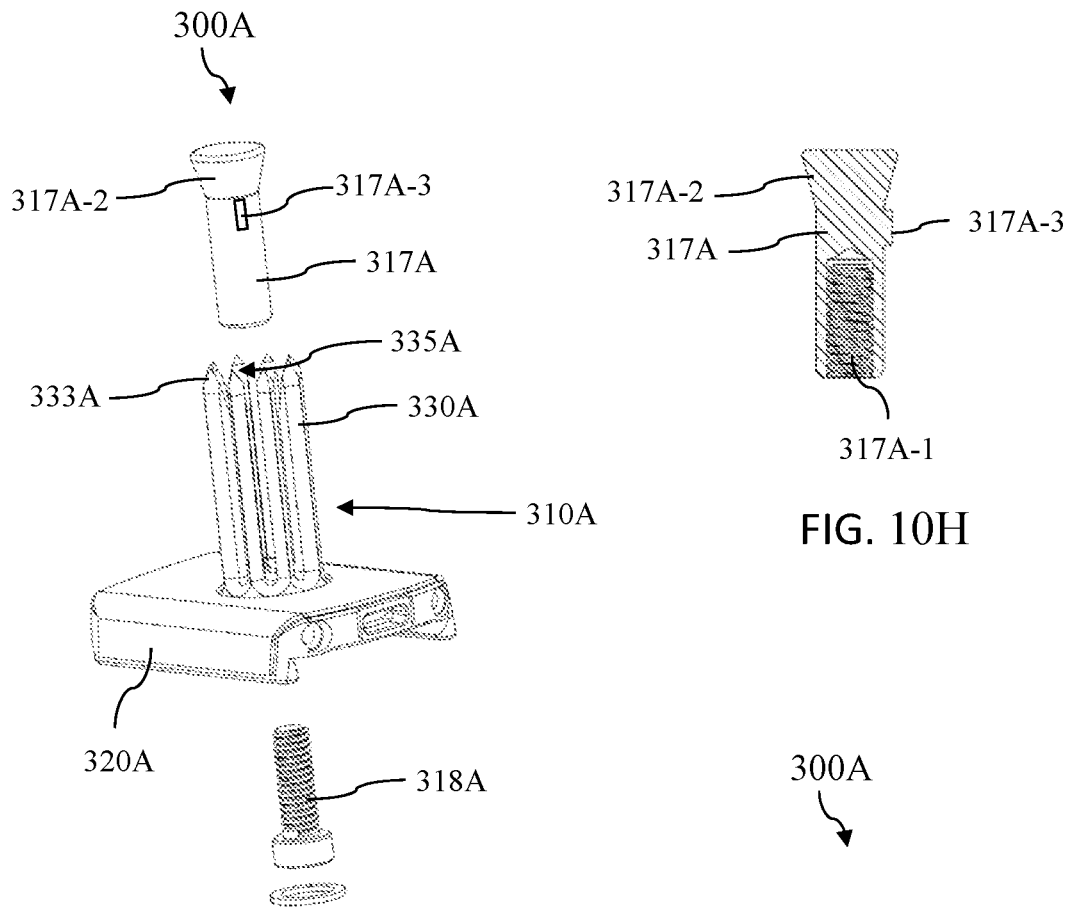
FIG. 10F
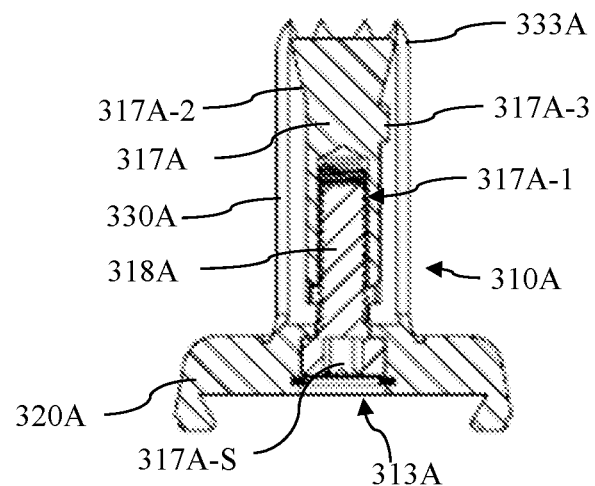
FIG. 10H
FIG. 10G

MULTIAXIAL MODULAR TIBIA STEMS

FIELD

The present disclosure is related to total ankle replacement.

BACKGROUND

Tibia stem components help engage implants where limited bone is available for total ankle arthroplasty. Pistoning or loosening of the implant can present as a long term complication. Thus, improved tibia stem components that can better engage with the tibia bone and improve immediate implant stability and reduce implant migration over time are desired.

SUMMARY

Disclosed herein are implants designed to engage cancellous, and possibly cortical, tibia bone to improve immediate implant stability and reduce implant migration over long term.

Disclosed is an ankle prosthesis comprising: a tibia stem component comprising a leading end, a trailing end, and a longitudinal axis defined therethrough; and a tibia tray component configured to be attached to a prosthetic joint articulating surface, wherein the tibia tray component extends from the trailing end of the tibia stem component, wherein the tibia stem component is sized and configured to be disposed in an intramedullary canal formed in a tibia, wherein the tibia stem component comprises: one or more retractable members configured to be controllably movable from a retracted position and be extended outward and away from the longitudinal axis, wherein in the retracted position, the one or more retractable members are contained substantially within the tibia stem component and do not extend outward, wherein when the tibia stem component is disposed in the intramedullary canal and the one or more retractable members are extended outward, the one or more retractable members engage the intramedullary canal's surrounding bone and enhance anchoring the tibia stem within the intramedullary canal.

Also provided is an ankle prosthesis, comprising: a tibia stem component comprising a leading end, a trailing end, and a longitudinal axis defined therethrough; and a tibia tray component configured to be attached to a prosthetic joint articulating surface, wherein the tibia tray component extends from the trailing end of the tibia stem component, wherein the tibia stem component is sized and configured to be disposed in an intramedullary canal formed in a tibia, wherein the tibia stem component is divided into two or more retractable members by longitudinal slits, extending from the leading end of the tibia stem component and partially toward the trailing end, formed in the tibia stem, whereby each of the two or more retractable members comprise a proximal end and a distal end, wherein their proximal ends are joined at the trailing end of the tibia stem component and their distal ends are freely moveable, wherein the two or more retractable members are configured to be controllably movable from a retracted position and be extended outward and away from the longitudinal axis, wherein in the retracted position, the two or more retractable members are parallel to the longitudinal axis and do not extend outward, wherein when the tibia stem component is disposed in the intramedullary canal and the two or more retractable members are extended outward, the two or more retractable members engage the intramedullary canal's surrounding bone and enhance anchoring the tibia stem within the intramedullary canal.

Also provided is an ankle prosthesis, comprising: a tibia stem component comprising a leading end, a trailing end, and a longitudinal axis defined therethrough; and a tibia tray component comprising a surface defining a reference plane, wherein the tibia stem component and the tibia tray component are modular and the tibia tray component and the trailing end of the tibia stem component are configured to form a joint wherein the tibia stem component's relative angle with respect to the reference plane can be adjusted so that the longitudinal axis forms an angle θ with an orthogonal of the reference plane, wherein the angle can be between 0 degrees up to and including 40 degrees, wherein the tibia stem component is sized and configured to be disposed in an intramedullary canal formed in a tibia, wherein the tibia stem component comprises: two or more retractable members configured to be controllably movable from a retracted position and be extended outward and away from the longitudinal axis, wherein in the retracted position, the one or more retractable members are contained substantially within the tibia stem component, and wherein when the tibia stem component is disposed in the intramedullary canal and the two or more retractable members are extended outward, the one or more retractable members engage the intramedullary canal's surrounding bone and enhance anchoring the tibia stem within the intramedullary canal.

BRIEF DESCRIPTION OF DRAWINGS

The features of the embodiments described herein will be more fully disclosed in the following detailed description, which is to be considered together with the accompanying drawings wherein like numbers refer to like parts. All drawings are schematic and are not intended to show actual dimensions or proportions.

FIGS. 3A-3J are illustrations of a prosthesis according to another embodiment of the present disclosure.

FIGS. 4A-4G are illustrations of a prosthesis according to another embodiment of the present disclosure.

FIGS. 5A-5F are illustrations of a prosthesis according to another embodiment of the present disclosure.

FIGS. 10D-10H are illustrations of a prosthesis according to another embodiment of the present disclosure.

DETAILED DESCRIPTION

Figure 1A:
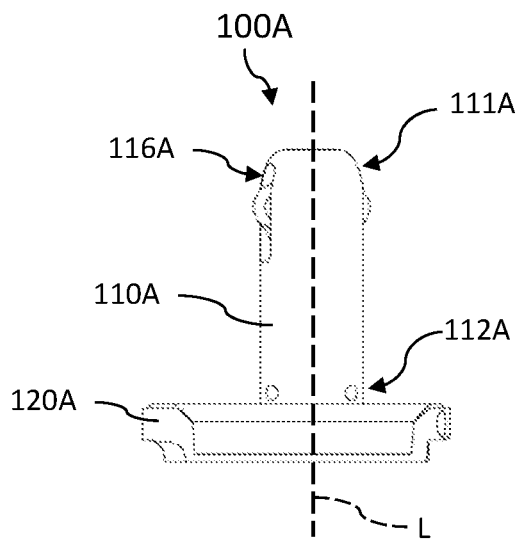
FIGS. 1A-1L are illustrations of a prosthesis according to an embodiment of the present disclosure.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The methods, systems, and structures described for the ankle herein may be adapted to other applications in arthroplasty, including but not limited to the knee, shoulder, hip, elbow, and other joints.

Referring to FIGS. 1A-7E, an ankle prosthesis 100A, 100B, 100C, 100D, 100E, 100F, 100G, 100H, 100I, 100J is disclosed. The ankle prosthesis comprises: a tibia stem component 110A, 110B, 110C, 110D, 110E, 110F, 110G, 110H, 110I, 110J; and a tibia tray component 120A, 120B, 120C, 120E, 120F, 120G, 120H, 120I, 120J configured to be attached to a prosthetic joint articulating surface. The tibia stem component comprises a leading end 111A, 111B, 111C, 111D, 111E, 111F, 111G, 111H, 111I, 111J a trailing end 112A, 112B, 112C, 112D, 112E, 112F, 112G, 112H, 112I, 112J and a longitudinal axis L defined therethrough.

The tibia tray component extends from the trailing end of the tibia stem component. The tibia stem component is sized and configured to be disposed in an intramedullary canal formed in a tibia. The tibia stem component comprises one or more retractable members 130A, 130B, 130C, 130D, 130E, 130F, 130G, 130H, 130I, 130J configured to be controllably movable from a retracted position and extended outward and away from the tibia stem component. In the retracted position, the one or more retractable members 130A, . . . 130J are contained substantially within the silhouette of the tibia stem component and do not extend outward. Substantially within the silhouette of the tibial stem means that a small portion (no more than about 0.5 mm) of the distal ends of the one or more retractable members can, in some embodiments, protrude out beyond the silhouette of the tibia stem. In use, after the tibia stem component is disposed in the intramedullary canal of a tibia, the one or more retractable members are moved from their retracted position outward and away from the longitudinal axis L so that the one or more retractable members engage the intramedullary canal's surrounding bone and enhance anchoring the tibia stem within the intramedullary canal.

In some preferred embodiments, the tibia stem component comprises two or more retractable members 130A, 130B, 130C, 130D, 130E, 130F, 130G, 130H, 130I, 130J. In many situations, having two or more retractable members can provide anchoring configurations that are more symmetrical. The symmetry involved here can be planar symmetry or radial symmetry with respect to the longitudinal axis L of the tibia stem component. Retraction of the retractable members 130A, 130B, 130C, 130D, 130E, 130F, 130G, 130H, 130I, 130J allows for in-situ adjustment, repositioning, and patient removal of the tibia stem component as necessary.

In some embodiments of the prosthesis 100A, 100B, 100C, 100D, 100E, 100F, 100G, 100H, 100I, 100J, the tibia tray comprises a channel 122A, 122B, 122C, 122D, 122E, 122F, 122G, 122H, 122I, 122J, extending between a pair of opposed rails 124A, 124B, 124C, 124D, 124E, 124F, 124G, 124H, 124I, 124J, for receiving the prosthetic joint surface.

In some embodiments of the prosthesis 100A, 100B, 100C, 100D, 100E, 100F, 100G, 100H, 100I, 100J, the channel in the tibia tray extends in an anterior-posterior direction, medial-lateral direction, or in an oblique direction.

In some embodiments of the prosthesis 100A, 100B, 100C, 100D, 100E, 100F, 100G, 100H, 100I, 100J, the one or more retractable members 130A, 130B, 130C, 130D, 130E, 130F, 130G, 130H, 130I, 130J extend away from the longitudinal axis L of the tibia stem component when moving from their retracted positions outward and away from the longitudinal axis L.

In some embodiments of the prosthesis 100A, 100B, 100C, 100D, 100E, 100F, 100G, 100H, 100I, 100J, the tibia stem comprises an elongated generally cylindrical shell defining an internal cavity 115A, 115B, 115C, 115D, 115E, 115F, 115G, 115H, 115I, 115J, that is open at the trailing end. An opening 116A, 116B, 116C, 116D, 116E, 116F, 116G, 116H, 116I, 116J is provided in the generally cylindrical shell of the tibia stem component for each of the one or more retractable members. The one or more retractable members extend outward through the opening in the cylindrical shell from the retracted position.

Figure 10A:
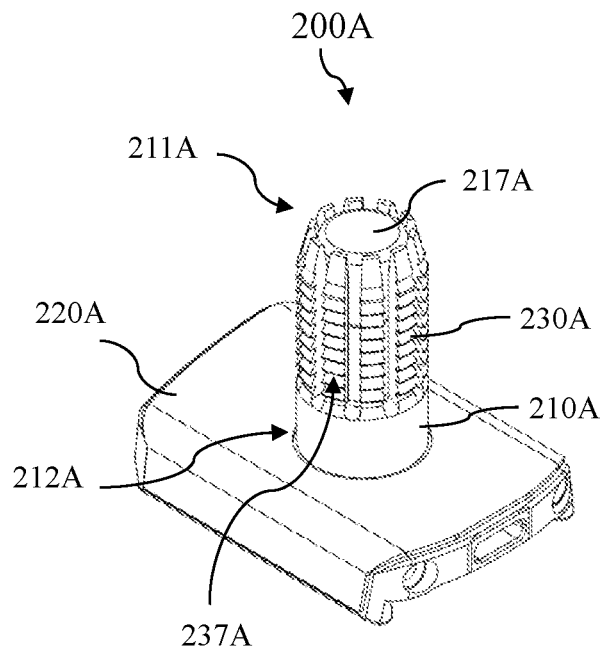
FIGS. 10A-10C are illustrations of a prosthesis according to another embodiment of the present disclosure.
Figure 11A:
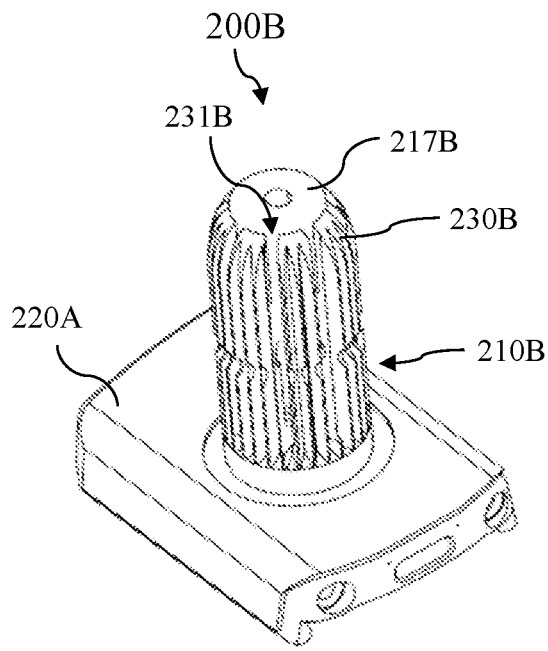
FIGS. 11A-11F are illustrations of a prosthesis according to another embodiment of the present disclosure.
Figure 11B:
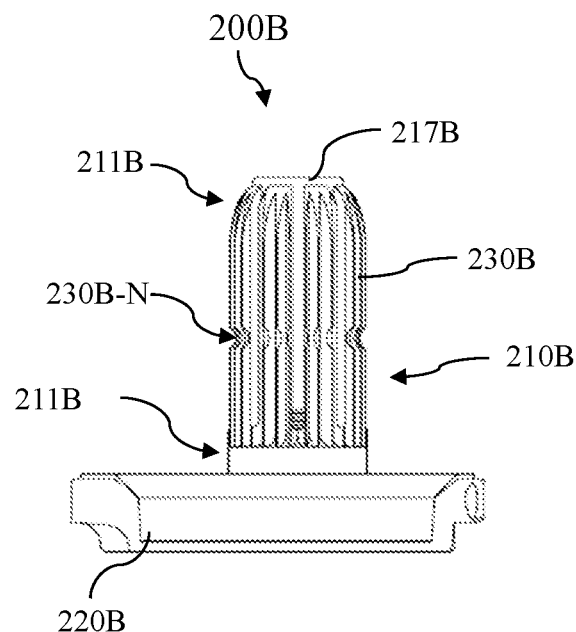
Figure 11C:
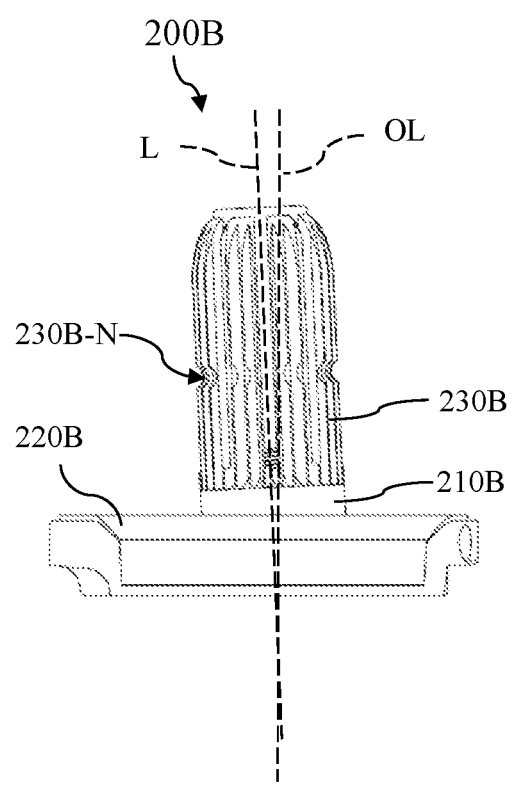

Although, the shape of the shell forming the tibia stem component is referred to as being generally cylindrical, the scope of the present disclosure encompasses a variety of shapes for the shell other than those having circular or oval cross-section. The term "generally cylindrical" as used herein is intended to encompass a structure for the shell that can have a variety of other cross-sectional shape such as polygons (i.e., a triangle, a quadrilateral, a pentagon, a hexagon, a heptagon, an octagon, etc.). Additionally, the term "generally cylindrical" as used herein is intended to encompass structures that may not have a continuous solid shell such as the shell forming the tibia stem components in the prosthesis embodiments 200A and 200B shown in FIGS. 10A and 11A, respectively. The tibial stems in prosthesis embodiments 200A and 200B do not have solid cylindrical structures but they do have generally cylindrical shapes.

In some embodiments of the prosthesis, the tibia stem further comprises a linear actuator 117A, 117B, 117C, 117D, 117E, 117F, 117G, 117H, 117I, 117J, provided within the internal cavity. The linear actuator is configured to be movable within the internal cavity along the longitudinal axis L. Each of the one or more retractable members have a distal end 131A, 131B, 131C, 131D, 131E, 131F, 131G, 131H, 131I, 131J and a proximal end 132A, 132B, 132C, 132D, 132E, 132F, 132G, 132H, 132I, 132J. The proximal end is attached to the linear actuator and the distal end is a free end that is movable through the respective opening 116A, 116B, 116C, 116D, 116E, 116F, 116G, 116H, 116I, 116J provided in the cylindrical shell of the tibia stem to engage the intramedullary canal's surrounding bone when the prosthesis is installed inside the intramedullary canal of a tibia. The movement of the one or more retractable members 130A, . . . 130J from the retracted position to being extended outward and away from the tibial stem component is controllably achieved by moving the linear actuator 117A, . . . 117J within the internal cavity 115A, . . . 115J. The movement of the linear actuator can be either toward the leading end 111A, . . . 111J or toward the trailing end 112A, . . . 112J in the axial direction along the longitudinal axis L.

The controlled axial movement of the linear actuator can be enabled in a variety of ways. In the disclosed exemplary embodiments of the prosthesis 100A, 100B, 100C, 100D, 100E, 100F, 100G, 100H, 100I, 100J, the axial movement of the linear actuator 117A, . . . 117J is achieved by a threaded action.

For example, in the prosthesis embodiments 100A, 100B shown in FIGS. 1A-2E, the linear actuators 117A, 117B comprise two parts: a base piece 117A-1, 117B-1 and a moving piece 117A-2, 117B-2, respectively. The base pieces 117A-1, 117B-1 are positioned in the their respective internal cavities 115A, 115B and is configured to be rotated about the longitudinal axis L but stationary so that they do not move in axial direction within the internal cavities 115A, 115B. The base pieces 117A-1, 117B-1 and the moving pieces 117A-2, 117B-2 threadedly engage each other to move the moving pieces 117A-2, 117B-2 axially (i.e., up and down) within their respective internal cavities 115A, 115B. The one or more retractable members 130A, 130B are attached to their respective moving pieces 117A-2, 117B-2 of the linear actuators 117A, 117B and by moving the moving pieces 117A-2, 117B-2 axially, the retractable members 130A, 130B can be moved from their retracted position to being extended outward away from the stem component.

Figure 1B:
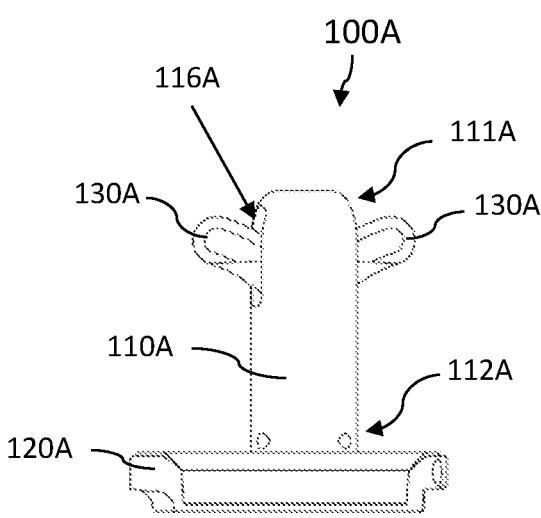
Figure 1C:
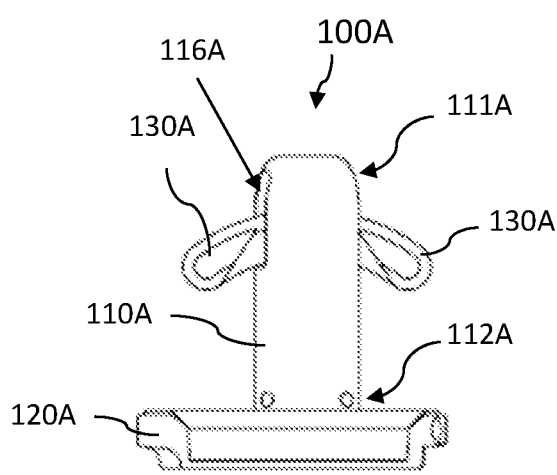
Figure 1D:
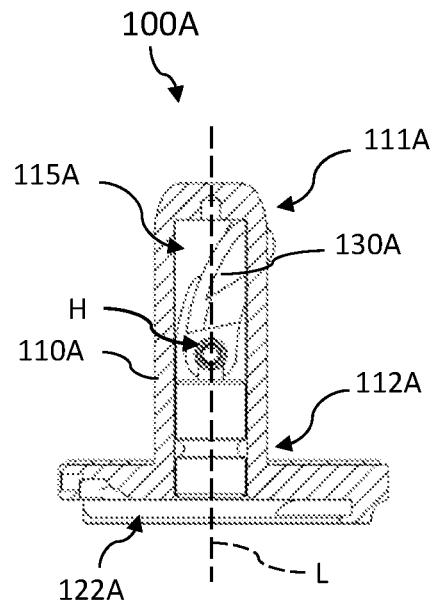
Figure 1E:
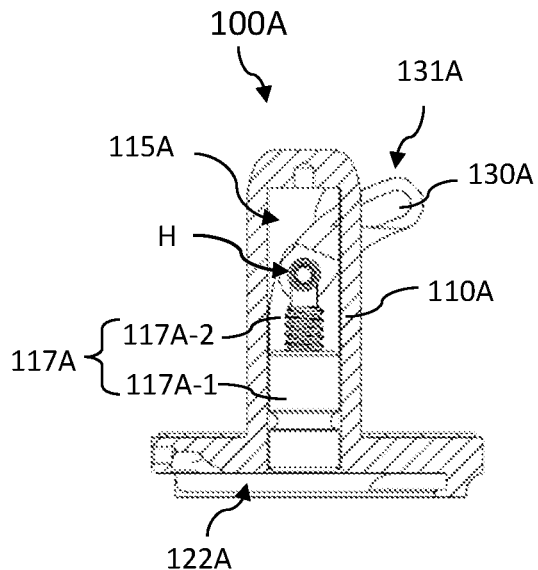
Figure 1F:
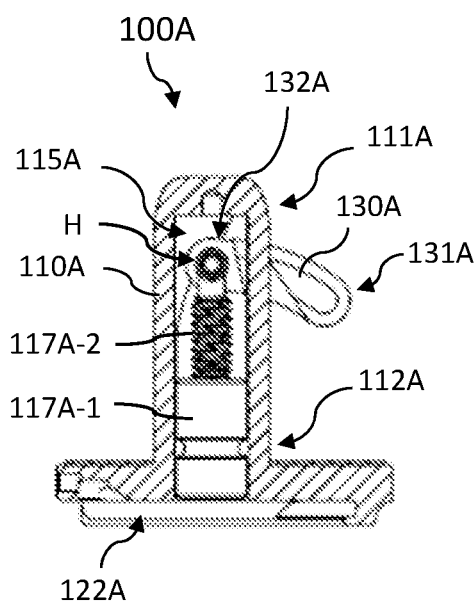
Figure 1G:
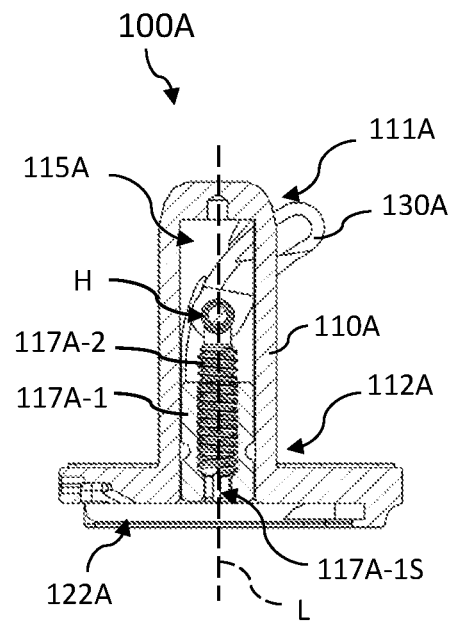
Figure 1H:
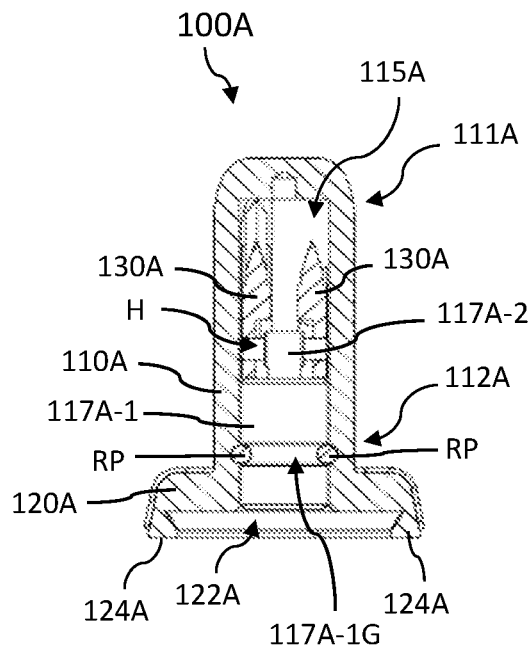
Figure 1I:
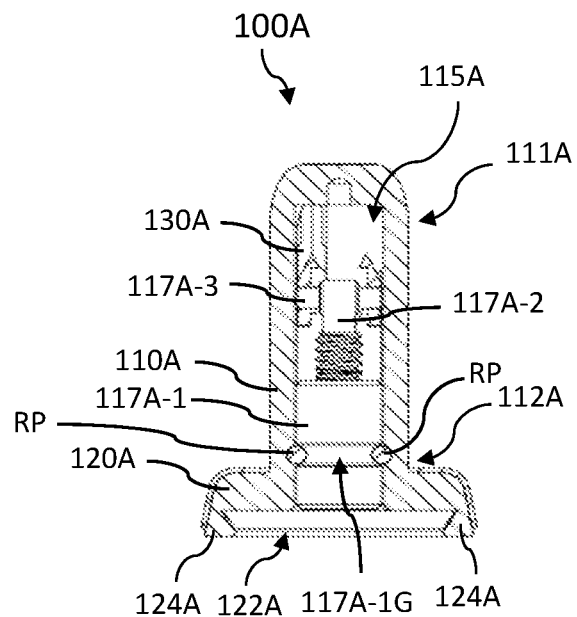
Figures 1J, 1K:
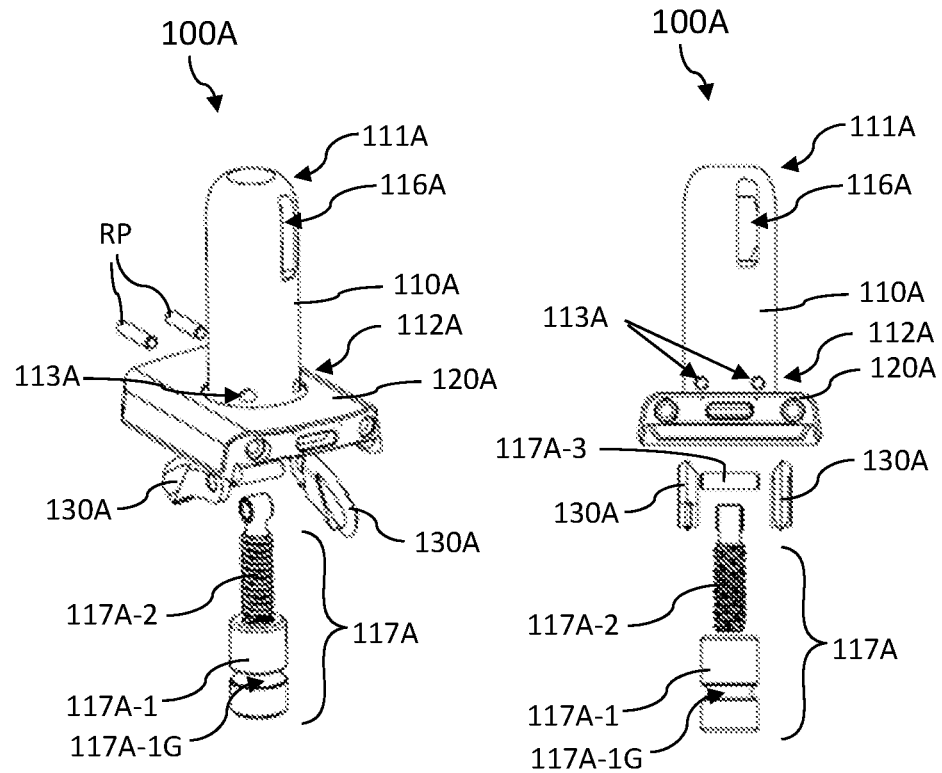
Figure 1L:
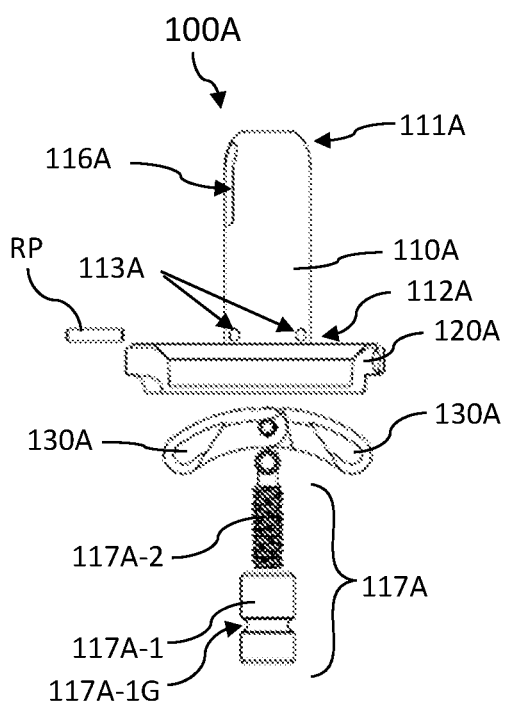

Referring to the cross-sectional view in FIG. 1G, in the prosthesis embodiment 100A, the base piece 117A-1 comprises an internally threaded hole that is open toward the leading end 111A and the threaded stem 117A-2 is received therein engaged by the mating threads. Because the base piece 117A-1 is stationary, turning the base piece 117A-1 clockwise or counter-clockwise will make the threaded stem 117A-2 to retract into away from the leading end 111A or extend out of the base piece toward the leading end 111A. This controlled up and down movement of the threaded stem 117A-2 can controllably move the one or more retractable members 130A from the retracted position shown in FIGS. 1A and 1D outward and away from the longitudinal axis L to the fully extended position shown in FIGS. 1C and 1F, and any configuration in between. FIGS. 1B, 1E, and 1G illustrate some of the intermediate positions. As previously mentioned, the one or more retractable members 130A move through the opening 116A provided in the generally cylindrical shell of the tibia stem component 110A.

Referring to FIG. 1F, in this example embodiment, the proximal end 132A of the one or more retractable members 130A are connected to the threaded stem 117A-2 by a hinged connection H. The hinged connection H can be accomplished by a pin 117A-3. The pin 117A-3 is shown in the exploded view of the prosthesis 100A in FIG. 1K. This hinged connection enables the threaded stem 117A-2 to move the one or more retractable members 130A from their retracted position and extend them through the respective openings 116A. Each of the one or more retractable members 130A has a curved shape that facilitates the extending outward movement as the threaded stem 117A-2 pushes the proximal end 132A of the retractable member 130A upward. Referring to FIGS. 1A and 1D, as the proximal end 132A of the retractable member 130A is pushed up by the threaded stem 117A-2, the top edge of the retractable member 130A is urged against the top edge of the opening 116A which guides the retractable member 130A to extend outward as the retractable member 130A swivels about the hinged joint H.

The screw threads on the base piece 117A-1 and the threaded stem 117A-2 can be matched to be either left-handed or right-handed which will determine which direction the base piece 117A-1 needs to be turned to raise or lower the threaded stem 117A-2.

In the illustrated example, the base piece 117A-1 is configured to stay stationary in the axial direction while still being rotatable within the internal cavity 115A by a pair of retaining pins RP. This can be better seen in FIGS. 1H-1L. The base piece 117A-1 is configured with an annular groove 117A-1G and the substantially cylindrical shell of the tibia stem component 110A comprises two generally parallel through holes 111A for receiving the retaining pins RP near the trailing end 112A. The two through holes 111A are positioned such that the retaining pins RP extend through the two through holes 111A and are aligned with the annular groove 117A-1G of the base piece 117A-1 so that the retaining pins RP intercept the groove from two opposing sides as shown in the cross-sectional views in FIGS. 1H and 1I, and hold the base piece 117A-1 in place within the internal cavity 115A. In some embodiments, the base piece 117A-1 is stationary near the trailing end 112A within the internal cavity and the moving piece 117A-2 is movable along the longitudinal axis L of the tibia stem component with respect to the base piece by operation of the threaded engagement.

The base piece 117A-1 can be provided with a tool-receiving socket 117A-1S (See FIG. 1G) at the bottom end so that a tool such as a wrench or a screwdriver can be used to turn the base piece 117A-1 and control the movement of the one or more retractable members 130A.

Figure 2A:
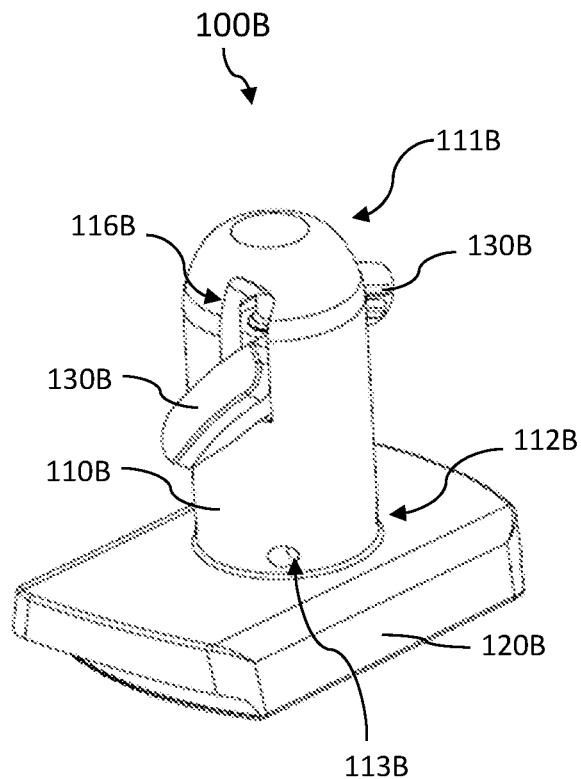
FIGS. 2A-2F are illustrations of a prosthesis according to another embodiment of the present disclosure.
Figure 2B:
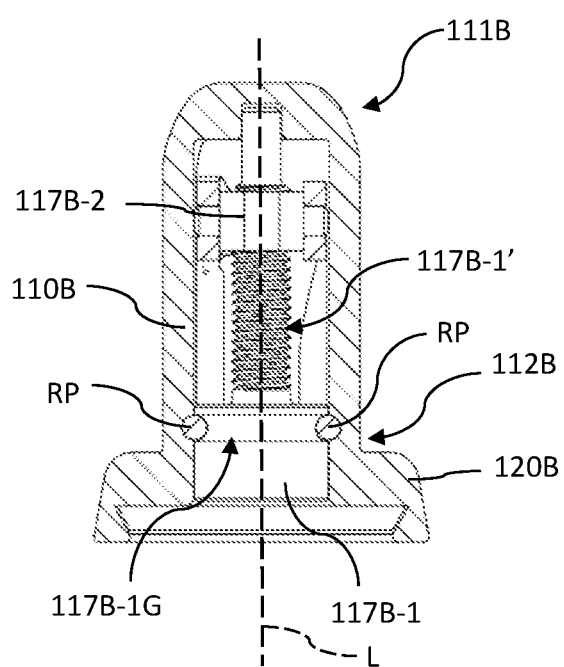
Figure 2C:
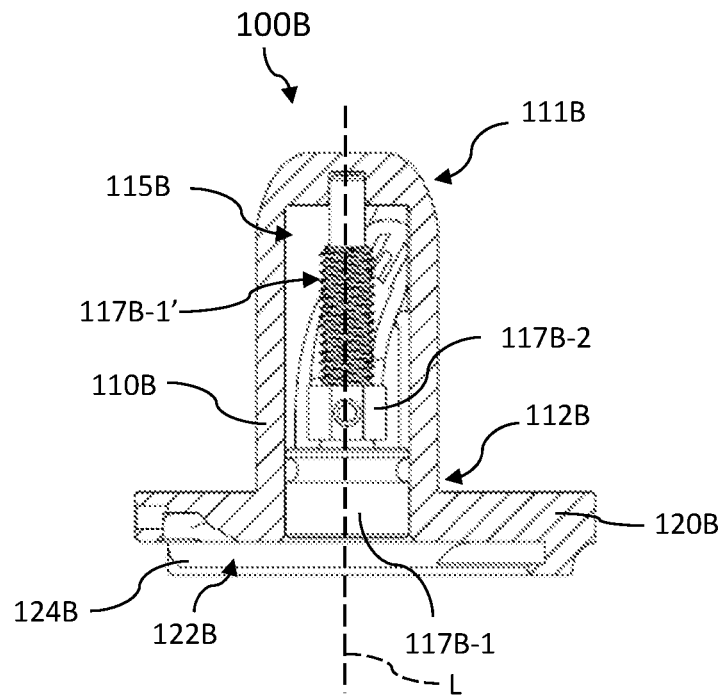
Figure 2D:
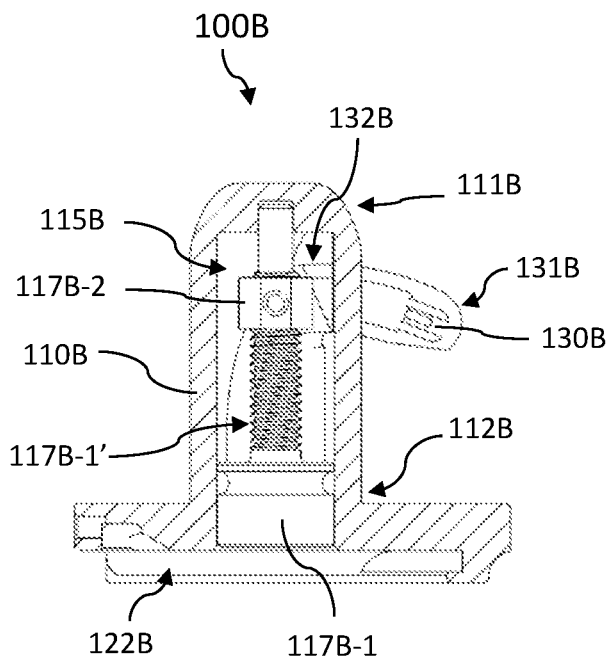
Figure 2E:
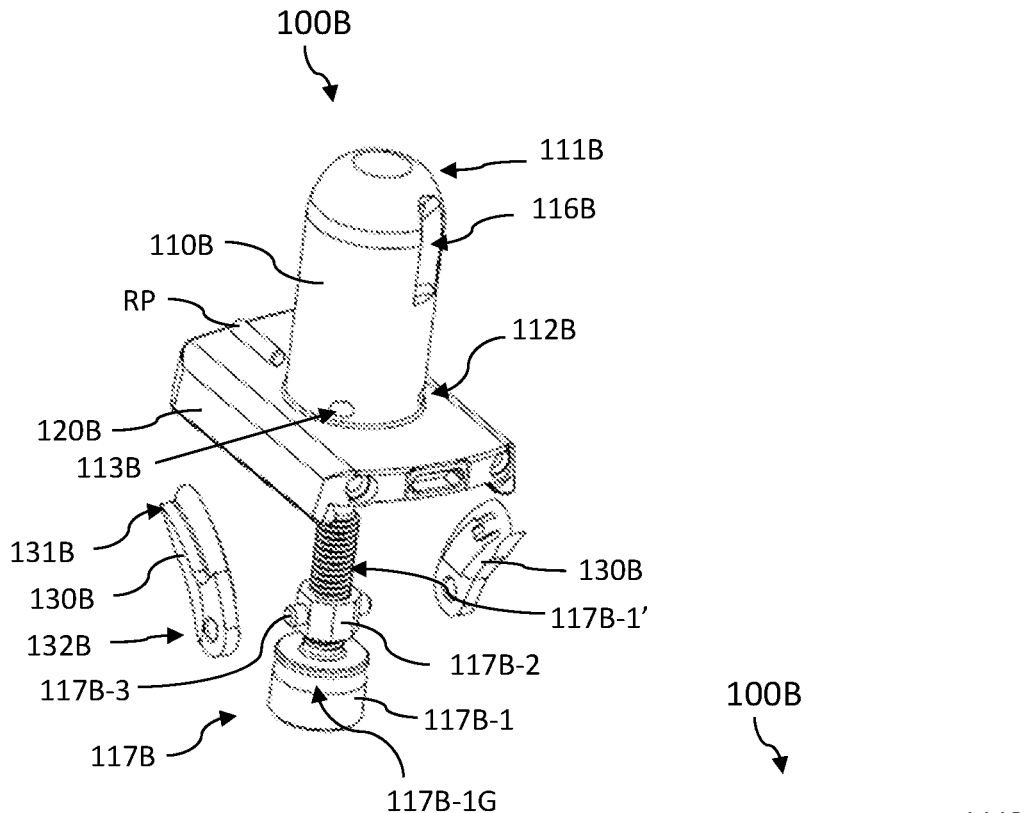
Figure 2F:
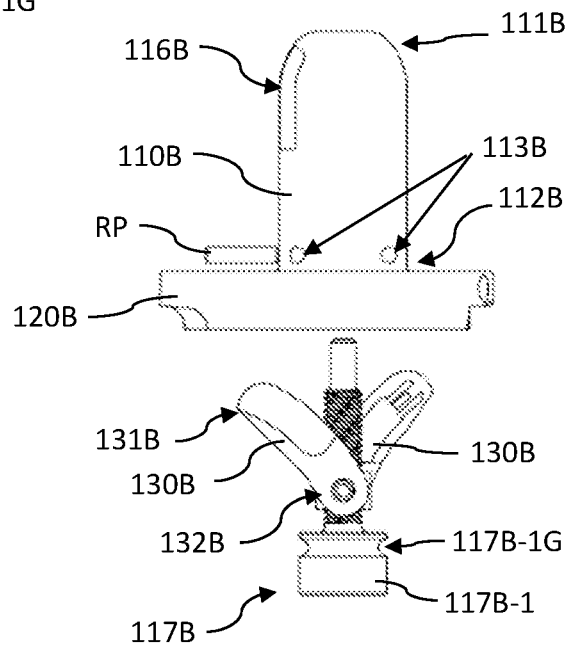

Referring to the cross-sectional views in FIGS. 2B-2D, in the prosthesis embodiment 100B, the base piece 117B-1 comprises a threaded stem portion 117B-1' and the moving piece 117B-2 is a threaded nut structure that threadedly engages the threaded stem portion 117B-1'. In other words, the threaded stem portion 117B-1' is a leadscrew and the moving piece 117B-2 is the leadscrew nut that translates the rotational motion of the leadscrew into a linear motion. The proximal ends 132B of the one or more retractable members 130B are connected to the moving piece 117B-2. Because the base piece 117B-1 is stationary, by turning the base piece 117B-1 clockwise or counter-clockwise, the moving piece 117B-2 can be moved up or down the threaded stem portion 117B-1' by operation of their threaded engagement. This controlled up and down movement of the moving piece 117B-2 can controllably move the one or more retractable members 130B from their retracted position shown in FIG. 2C outward and away from the longitudinal axis L to their fully extended position shown in FIG. 2D, and any configuration in between. As previously mentioned, the one or more retractable members 130B move through the opening 116B provided in the generally cylindrical shell of the tibia stem component 110B.

Referring to FIG. 2D, in this example embodiment, the proximal end 132B of the one or more retractable members 130B are connected to the moving piece 117B-2 by a hinged connection H. The hinged connection H can be accomplished by connecting pins 117B-3 provided on the moving piece 117B-2. The connecting pins 117B-3 are shown in the exploded view of the prosthesis 100B in FIG. 2E. This hinged connection enables the moving piece 117B-2 to move the one or more retractable members 130B from their retracted position and extend them through the respective openings 116B. Each of the one or more retractable members 130B has a curved shape that facilitates the extending outward movement as the moving piece 117B-2 pushes the proximal end 132B of the retractable member 130B upward. Referring to FIGS. 2C and 2D, as the proximal end 132B of the retractable member 130B is pushed up by the moving piece 117A-2, the top edge of the retractable member 130B is urged against the top edge of the opening 116B which guides the retractable member 130B to extend outward as the retractable member 130B swivels about the hinged joint H.

The screw threads on the threaded stem portion 117B-1' and the moving piece 117B-2 can be matched to be either left-handed or right-handed which will determine which direction the base piece 117B-1 needs to be turned to raise or lower the moving piece 117B-2.

The base piece 117B-1 can be provided with a tool-receiving socket (not shown) similar to the tool-receiving socket 117A-1S of the base piece 117A-1 at the bottom end so that a tool such as a wrench or a screwdriver can be used to turn the base piece 117B-1 and control the movement of the one or more retractable members 130B.

In the illustrated example, the base piece 117B-1 is configured to stay stationary in the axial direction while still being rotatable within the internal cavity 115B by a pair of retaining pins RP. The retaining pins RP works the same way as in the prosthesis 100A. This can be better seen in the cross-sectional view in FIG. 2B and the exploded views FIGS. 2E-2F. The base piece 117B-1 is configured with an annular groove 117B-1G and the substantially cylindrical shell of the tibia stem component 110B comprises two generally parallel through holes 111B for receiving the retaining pins RP near the trailing end 112B. The two through holes 111B are positioned such that the retaining pins RP extend through the two through holes 111B and are aligned with the annular groove 117B-1G of the base piece 117B-1 so that the pins RP intercept the groove from two opposing sides as shown in the cross-sectional views in FIGS. 1H and 1I, and hold the base piece 117B-1 in place within the internal cavity 115B.

In some embodiments of the prosthesis 100C, 100D, 100E, 100F, 100G, 100H, the proximal ends 132C, . . . 132H of the one or more retractable members 130C, . . . 130H are attached to the substantially cylindrical shell of the tibia stem 110C, . . . 110H and the distal end being a free end that engages the intramedullary canal's surrounding bone. In preferred embodiments, the one or more retractable members 130C, . . . 130H are hingeably attached to the substantially cylindrical shell of the tibia stem.

In some embodiments of the prosthesis 100C, 100D, 100E, 100F, 100G, 100H, the tibia stem 110C, . . . 110H further comprises a linear actuator 117C, . . . 117H provided within the internal cavity 115C, . . . 115H. The linear actuator 117C, . . . 117H is configured to be axially movable within the internal cavity along the longitudinal axis L. Each of the one or more retractable members 130C, . . . 130H have a distal end 131C, . . . 131H and a proximal end 132C, . . . 132H, and the proximal end is attached to the substantially cylindrical shell of the tibia stem 110C, . . . 110H. The distal end 131C, . . . 131H a free end that engages the intramedullary canal's surrounding bone. In preferred embodiments, the proximal end 132C, . . . 132H is hingeably attached to the substantially cylindrical shell of the tibial stem.

In some embodiments of the prosthesis 100C, 100D, 100E, 100F, 100G, 100H, the movement of the linear actuator 117C, . . . 117H toward the leading end 111C, . . . 111H of the tibia stem 110C, . . . 110H enables the one or more retractable members to move outward and away from the longitudinal axis L. In some embodiments, the linear actuator and the internal cavity's sidewall engage each other for moving the linear actuator within the internal cavity 115C, . . . 115H. In some embodiments, the linear actuator 117C, . . . 117H and the internal cavity's sidewall threadedly engage each other.

For example, in the prosthesis embodiment 100C shown in FIGS. 3A-3J, the proximal end 132C of each of the one or more retractable members 130C comprises a cam surface 135C (see FIGS. 3I and 3J) that is configured to engage the linear actuator 117C. The linear actuator 117C comprises a base piece 117C-1 and a top piece 117C-2. As shown in the cross-sectional views shown in FIGS. 3E, 3F, 3H, and 3I, the top piece 117C-2 and the base piece 117C-1 are situated within the internal cavity 115C with the top piece 117C-2 above the base piece 117C-1. As shown in the exploded view in FIG. 3J, the top piece and the base piece are assembled in such a way so that the base piece 117C-1 can be rotated about the longitudinal axis L relative to the top piece 117C-2. In the illustrated example, the base piece 117C-1 comprises an axially located pin 117C-1' that fits into a mating hole (not shown) provided on the top piece 117C-2. In other embodiments, the location of the pin 117C-1' can be reversed so that the top piece 117C-2 comprises the pin and the base piece 117C-1 comprises the mating hole.

The base piece 117C-1 is threaded on its outer surface and the sidewall of the internal cavity 115C is threaded so that the base piece 117C-1 and the tibia stem component 110C threadedly engage each other. By turning the base piece 117C-1 clockwise or counter-clockwise, the base 117C-1 can be moved up or down within the internal cavity 115C by operation of their threaded engagement. When the base piece 117C-1 moves up into the internal cavity 115C, it pushes the top piece 117C-2 upward. As the top piece 117C-2 moves up, the leading end of the top piece 117C-2 is a cam engaging surface and contacts the cam surface 135C of the one or more retractable members 130C and moves the one or more retractable members 130C from their retracted position shown in FIG. 3C outward and away from the longitudinal axis L to their fully extended position shown in FIG. 3H, and any configuration in between. As previously mentioned, the one or more retractable members 130C move through the opening 116C provided in the generally cylindrical shell of the tibia stem component 110C.

As used herein, the terms "cam surface" and "cam engaging surface" refer to any paired surfaces on two components, one on each component, that come in contact with each other and operate to result in urging one or both of the two components to move in an intended manner. Thus, one of the two paired surfaces is referred to as the cam surface and the corresponding surface on the other component is referred to as the cam engaging surface.

Figure 3A:
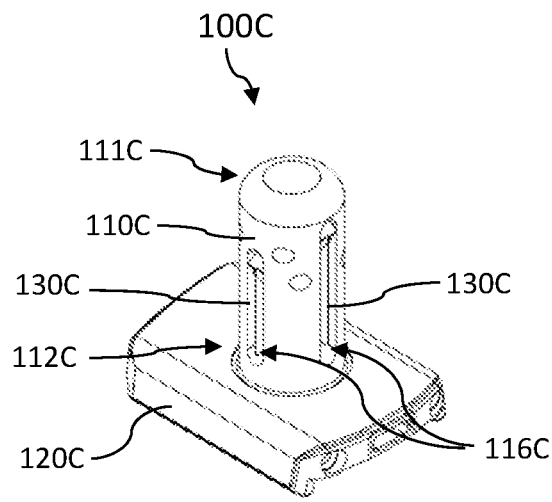
Figure 3B:
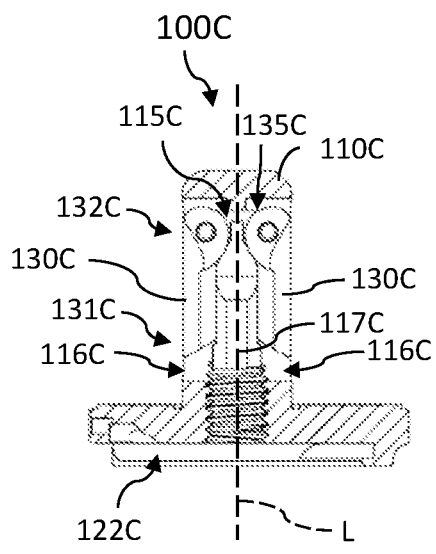
Figure 3C:
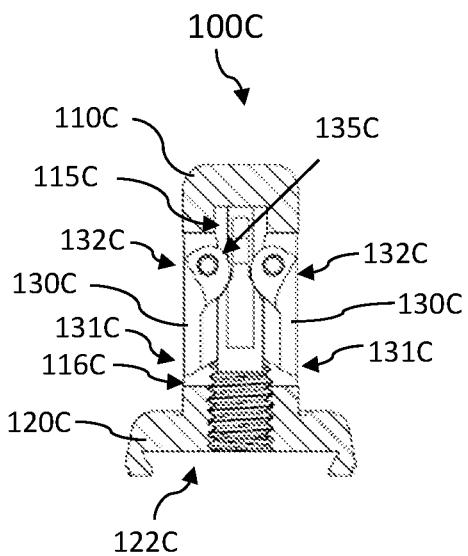
Figure 3G:
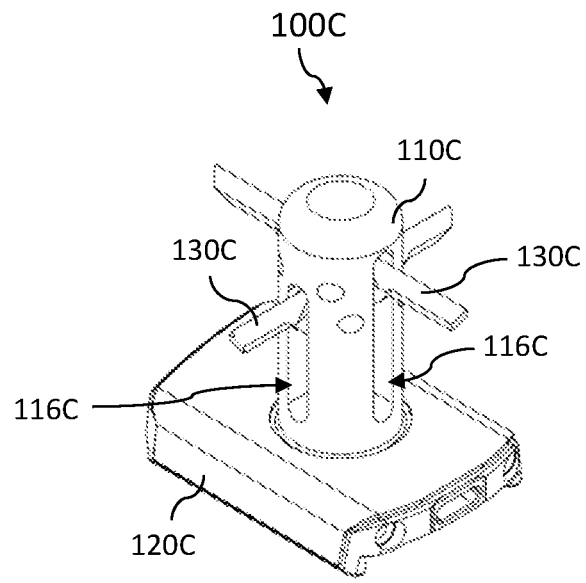
Figure 3H:
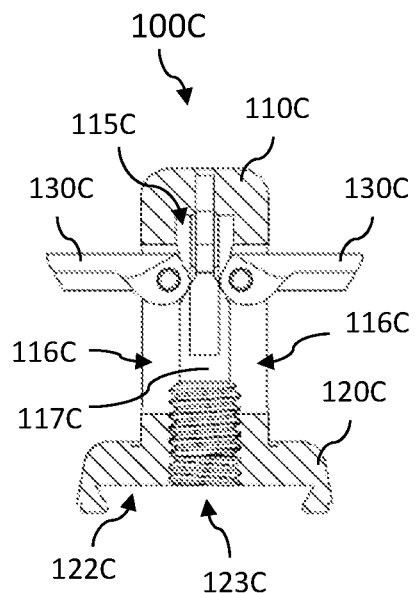
Figure 3I:
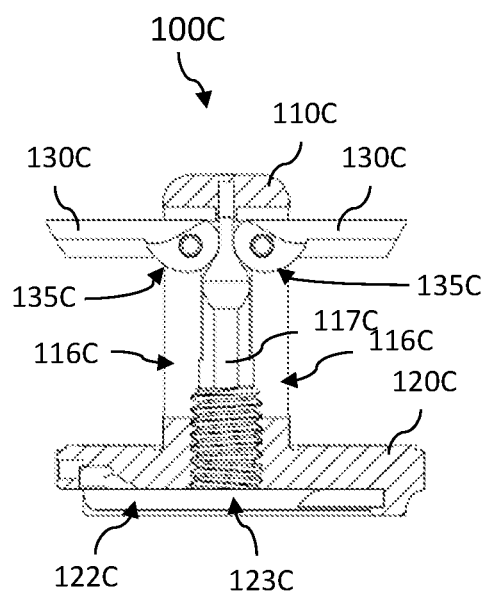
Figure 3J:
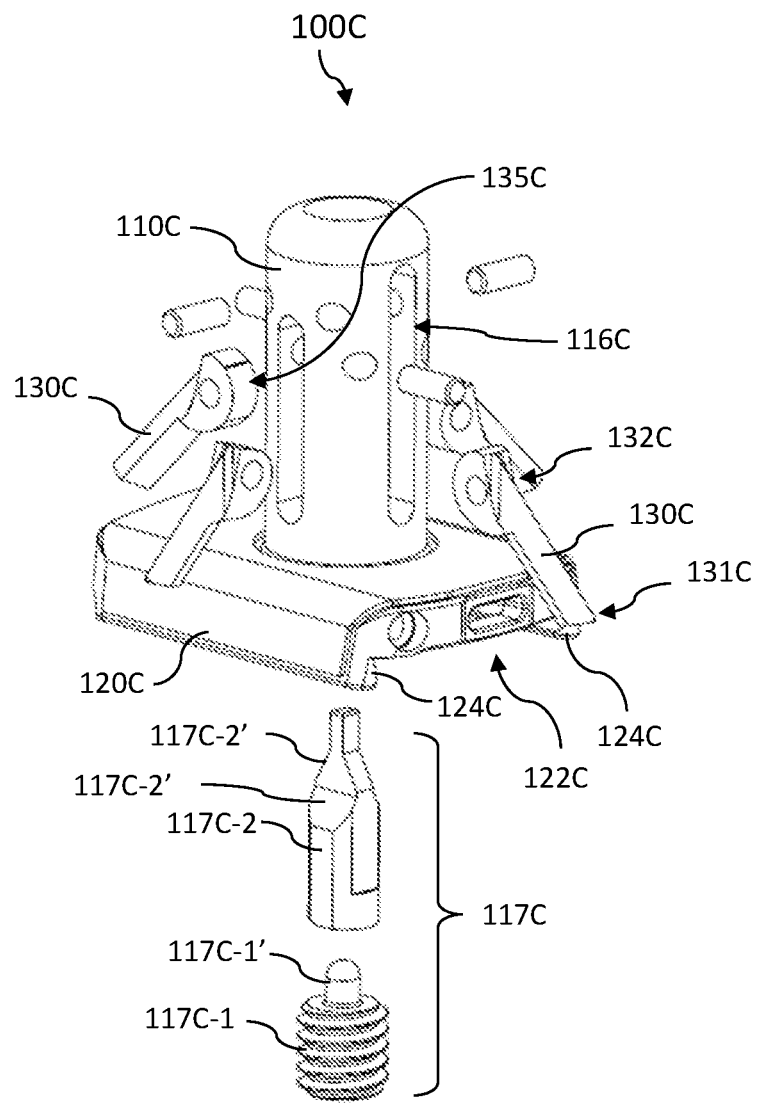
Figure 4A:
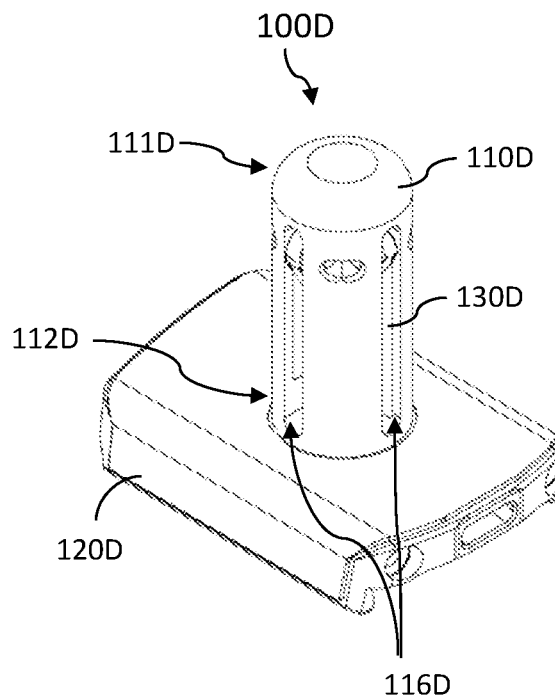
Figure 4B:
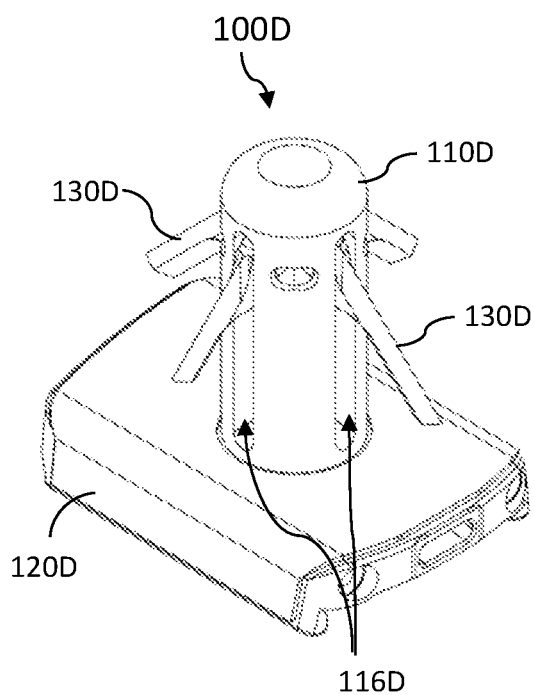
Figure 4F:
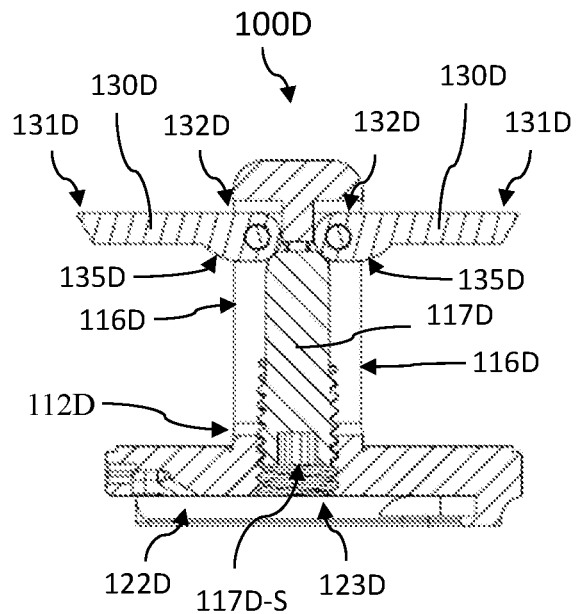
Figure 4G:
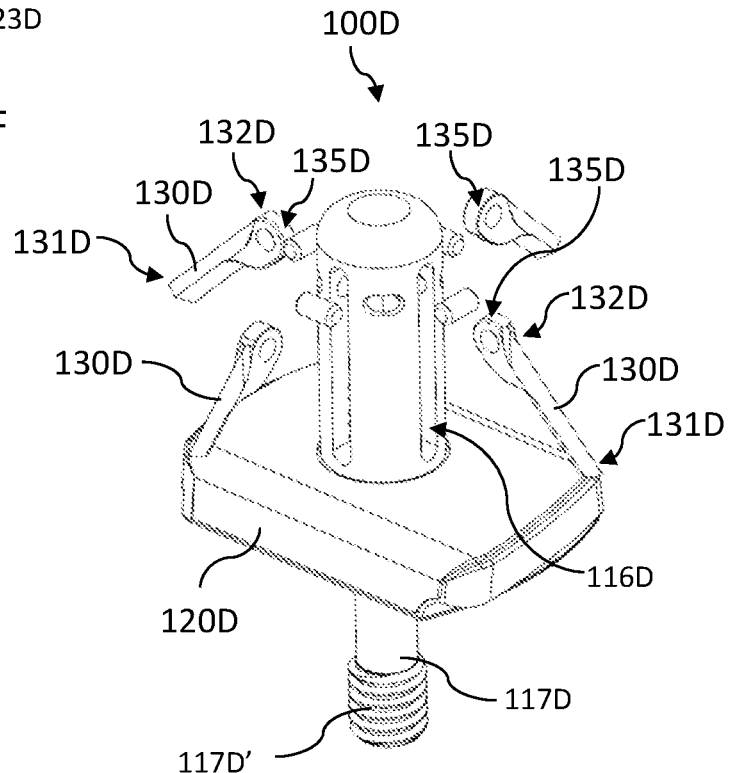
Figure 5A:
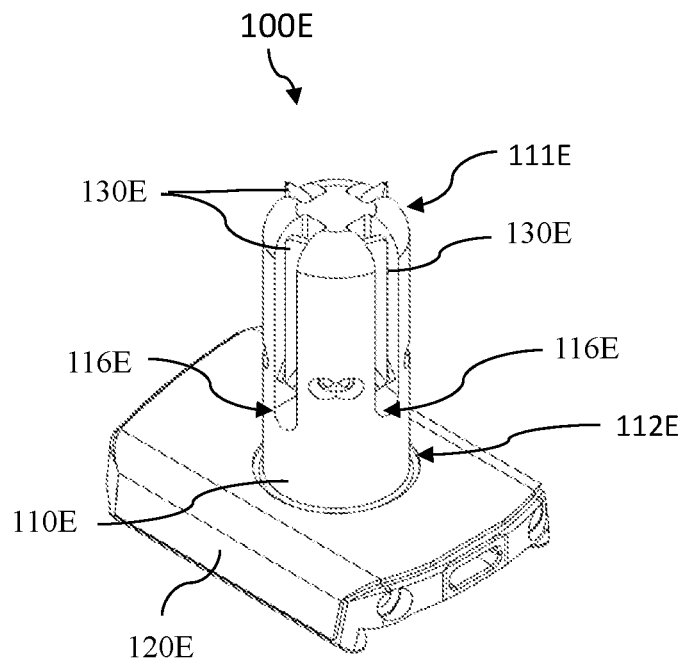
Figure 5B:
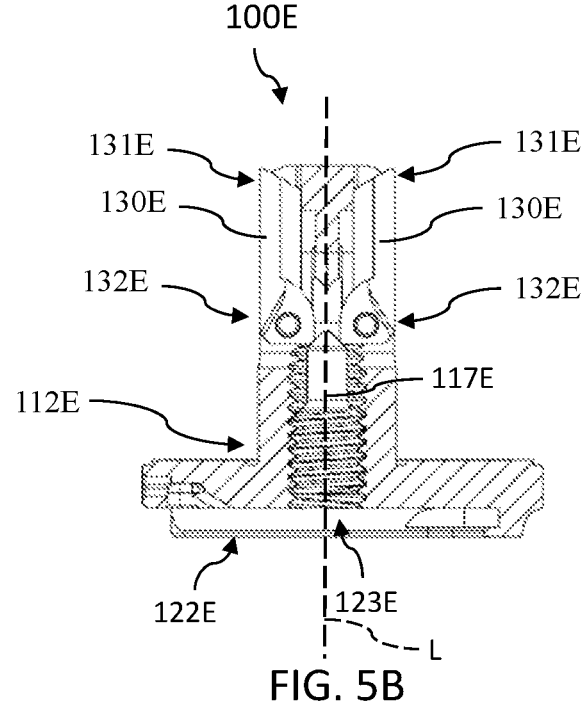
Figure 5F:
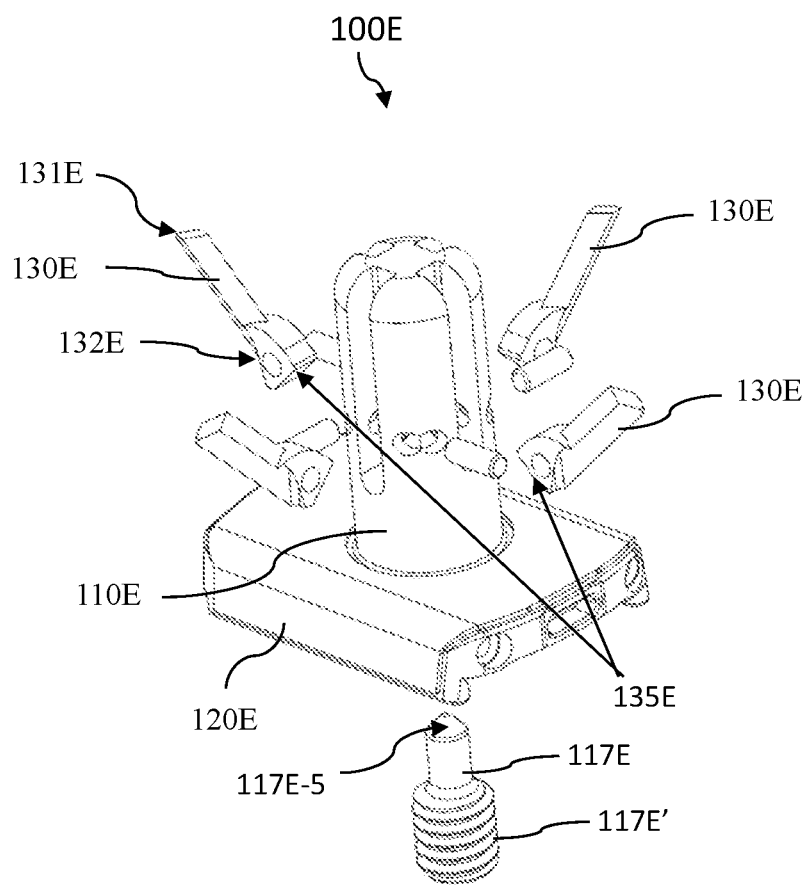

The prosthesis 100C comprises two pairs of retractable members 130C. The retractable members 130C in each pair are positioned opposite from each other, as shown in FIGS. 3A, 3D, and 3G, and the leading end of the top piece 117C-2 extends between two retractable members 130C in each pair. As shown in the cross-sectional views FIGS. 3B, 3C, 3E, 3F, 3H, and 3I, the leading end of the top piece 117C-2 is in contact with the cam surface 135C of the retractable members 130C. As shown in FIG. 3J, the leading end of the top piece 117C-2 comprises two pairs of slanted surfaces 117C-2' and 117C-2" and each pair contacts the corresponding pairs of the cam surfaces 135C of the retractable members 130C. The movement of the retractable members 130C from their retracted position outward and away from the longitudinal axis L is enabled by the engagement between the slanted surfaces 117C-2' and 117C-2" and the cam surfaces 135C. As the linear actuator assembly 117C is raised toward the leading end 111C of the tibia stem component, the two pairs of the slanted surfaces 117C-2' and 117C-2" wedged between the two pairs of the cam surfaces contact the cam surfaces 135C and pushes each of the retractable members to move from the retracted position outward and away from the longitudinal axis L.

Referring to FIGS. 4A-4G, in the prosthesis embodiment 100D, the linear actuator 117D comprises externally threaded surface 117D' (See FIG. 4G) that engages the corresponding threads on the sidewall of the internal cavity 115D. By turning the linear actuator 117D clockwise or counterclockwise, the linear actuator 117D can be moved up or down within the internal cavity 115D by operation of their threaded engagement. As the linear actuator 117D moves up, the leading end of the linear actuator 117D contacts the cam surface 135D of the one or more retractable members 130D and moves the one or more retractable members 130D from their retracted position shown in FIG. 4C outward and away from the longitudinal axis L toward the fully extended position shown in FIG. 4F, and any configuration in between. The linear actuator 117D can be provided with a tool-receiving socket 117D-S(See FIGS. 4D, 4E, 4F) on the bottom end (the end near the trailing end 112D) that is accessible through the opening 123D at the trailing end 112D so that a tool such as a wrench, a screwdriver, etc. can be used to turn the linear actuator 117D. The one or more retractable members 130D move through the opening 116D provided in the generally cylindrical shell of the tibia stem component 110D.

Referring to FIGS. 5A-5F, in the prosthesis embodiment 100E, the linear actuator 117E comprises externally threaded surface 117E' (See FIG. 5E) that engages the corresponding threads on the sidewall of the internal cavity 115E. The linear actuator 117E also can be provided with a tool-receiving socket similar to the socket 117D-S on the bottom end that is accessible through the opening 123E at the trailing end 112E so that a tool such as a wrench, a screwdriver, etc. can be used to turn the linear actuator 117E.

Referring to FIGS. 7A-7G, in the prosthesis embodiment 100G, the linear actuator 117G comprises a base piece 117G-1 and a top piece 117G-2. This structure is similar to the two-piece configuration of the linear actuator 117G described above. The base piece 117G-1 is threaded on its outer surface and the sidewall of the internal cavity 115G is threaded so that the base piece 117G-1 and the tibia stem component 110G threadedly engage each other. By turning the base piece 117G-1 clockwise or counterclockwise, the base 117G-1 can be moved up or down within the internal cavity 115G by operation of their threaded engagement. When the base piece 117G-1 moves up into the internal cavity 115G, it pushes the top piece 117G-2 upward. As the top piece 117G-2 moves up, the leading end of the top piece 117G-2 contacts the camming surface 135G of the one or more retractable members 130G and moves the one or more retractable members 130G from their retracted position shown in FIG. 7B outward and away from the longitudinal axis L to their fully extended position shown in FIG. 7F, and any configuration in between. As previously mentioned, the one or more retractable members 130G move through the opening 116G provided in the generally cylindrical shell of the tibia stem component 110G.

In some embodiments of the prosthesis 100C, 100D, 100E, 100G, 100H the linear actuator 117C, 117D, 117E, 117G, 117H comprises a leading end and a trailing end corresponding with the direction of the tibia stem's leading end 111C, 111D, 111E, 111G, 111H and trailing end 112C, 112D, 112E, 112G, 112H, and the linear actuator further comprises a cam engaging surface 117C-2' 117D-5, 117E-5, 117G-5, 117H-5 near its leading end, and each of the proximal ends of the two or more retractable members comprises a cam surface 135C, 135D, 135E, 135G, 135H that engages the cam engaging surface that enables the one or more retractable members to move outward and away from the longitudinal axis L when the linear actuator moves toward the leading end of the tibia stem.

In some embodiments of the prosthesis, the distal surface 131A, . . . 131H of each of the one or more retractable members 130A, . . . 130H comprise a plurality of surface features that are configured to engage the intramedullary canal's surrounding bone and enhance anchoring the tibia stem within the intramedullary canal. Such surface features can be any surface feature such as surface texturing or teeth having a biased orientation.

Referring to FIGS. 6A-6G, according to some embodiments, disclosed is a prosthesis 100F, wherein the tibia stem component 110F further comprises an actuator 117F provided within the internal cavity 115F. The actuator 117F is configured to be rotatable about the longitudinal axis L within the internal cavity. Each of the one or more retractable members 130F have a distal end 131F and a proximal end 132F, the proximal end being attached to the tibia stem component 110F and the distal end being a free end that engages the intramedullary canal's surrounding bone. The one or more retractable members 130F are moved from the retracted position and extended outward and away from the longitudinal axis L by rotating the actuator 117F within the internal cavity.

In some embodiments of the prosthesis 100F, the actuator 117F comprises a leadscrew portion 117F-S and the proximal end of each of the one or more retractable members comprises a toothed gear portion 136F that is engaged with the leadscrew portion. Rotating the actuator 117F engages the leadscrew 117F-S and the toothed gear portion 136F for moving the one or more retractable members from the retracted position.

Figure 6A:
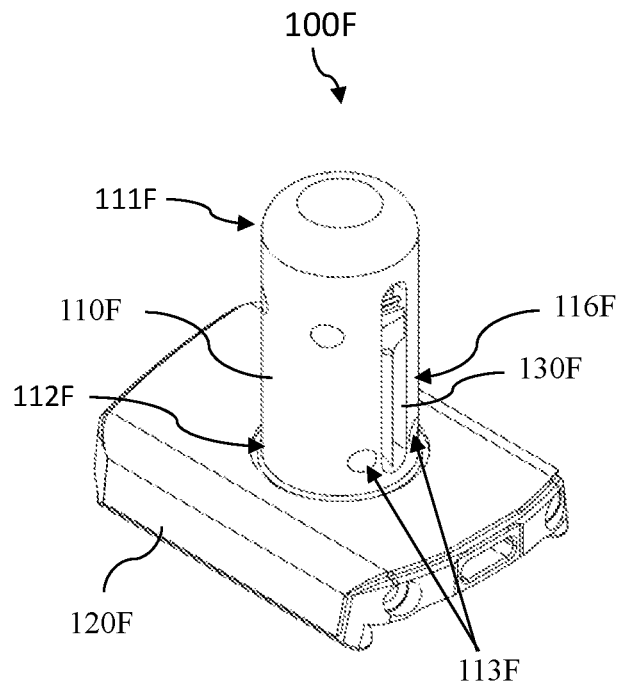
FIGS. 6A-6G are illustrations of a prosthesis according to another embodiment of the present disclosure.
Figure 6B:
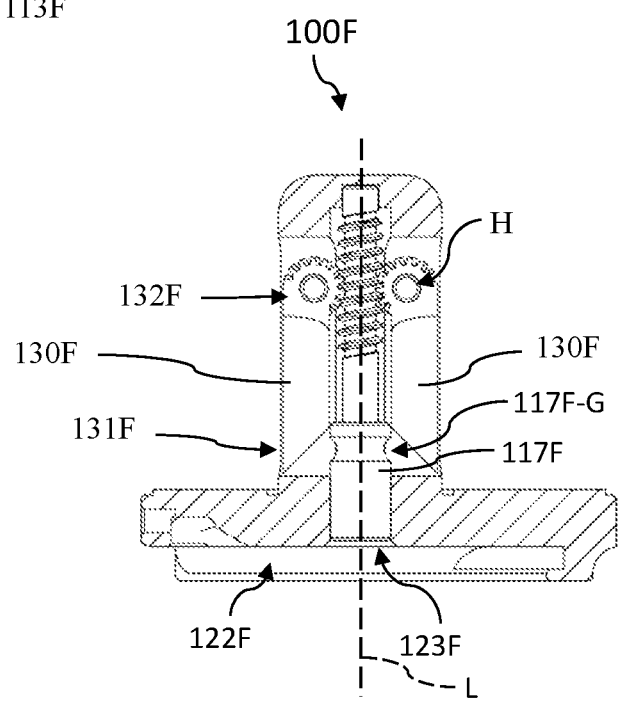
Figure 6C:
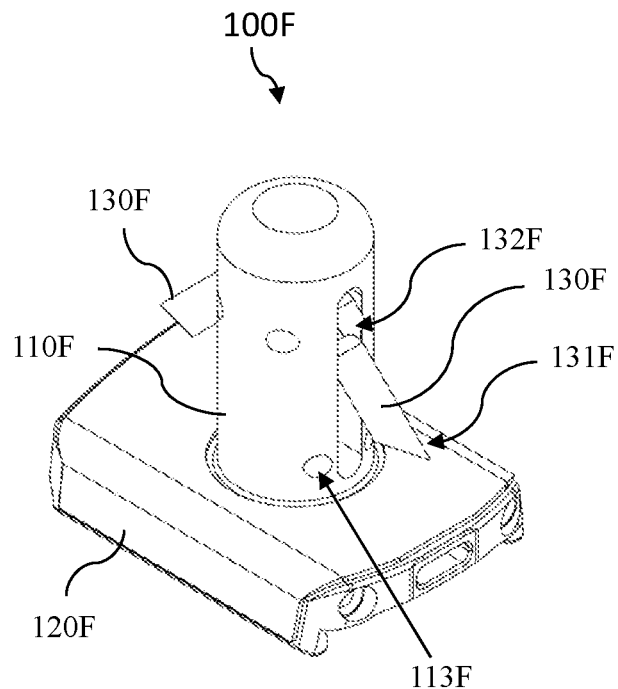
Figure 6D:
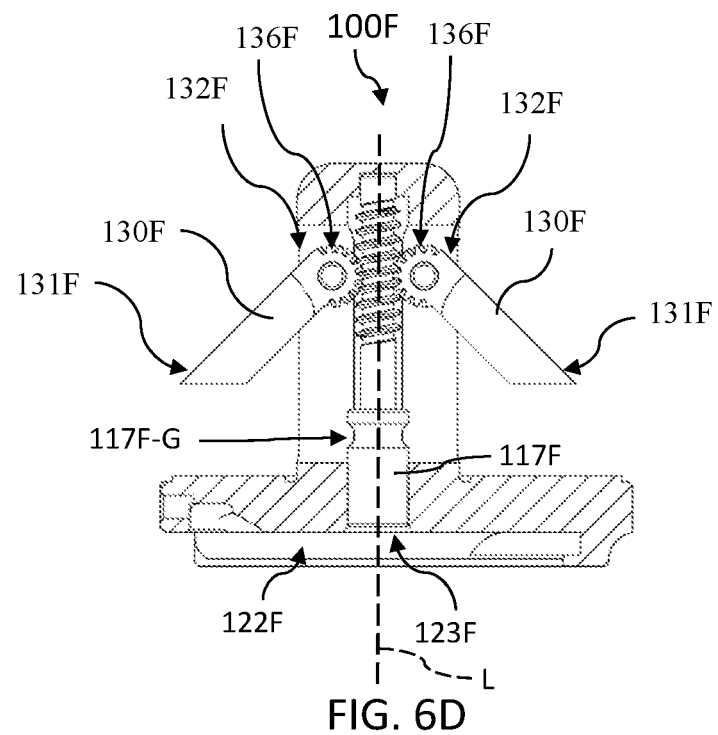
Figure 6E:
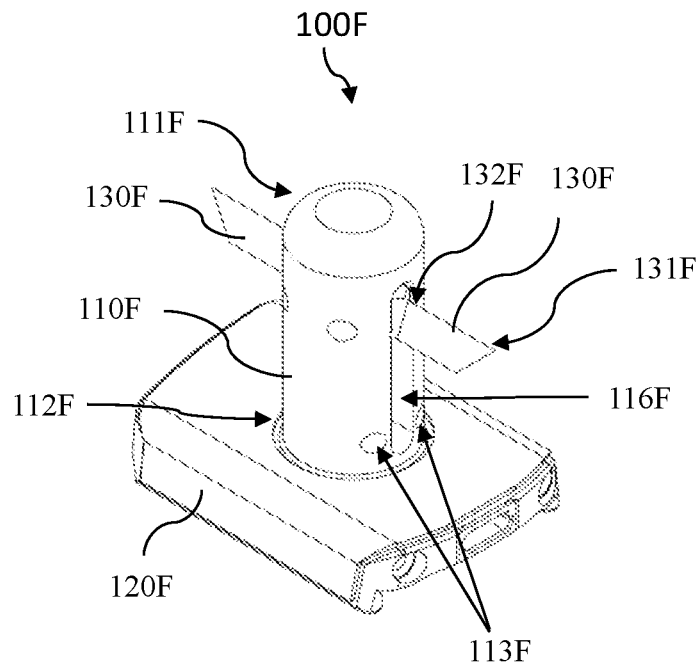
Figure 6F:
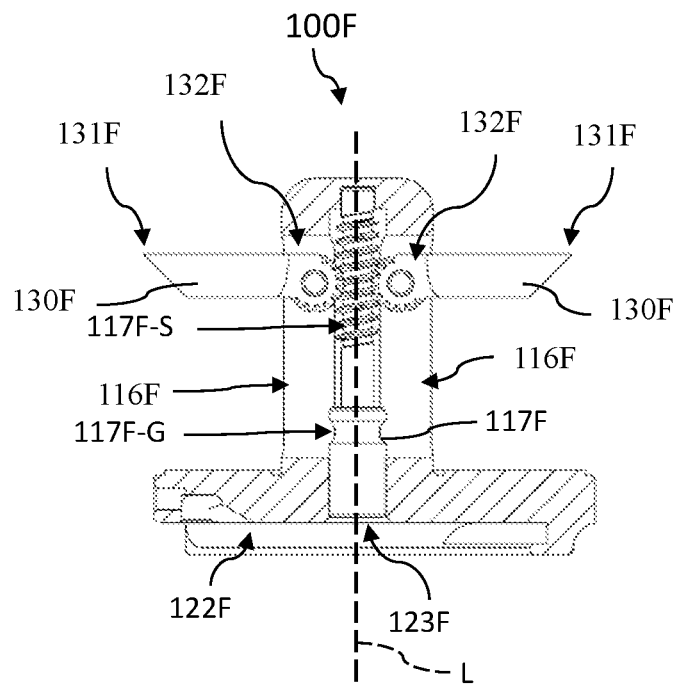
Figure 6G:
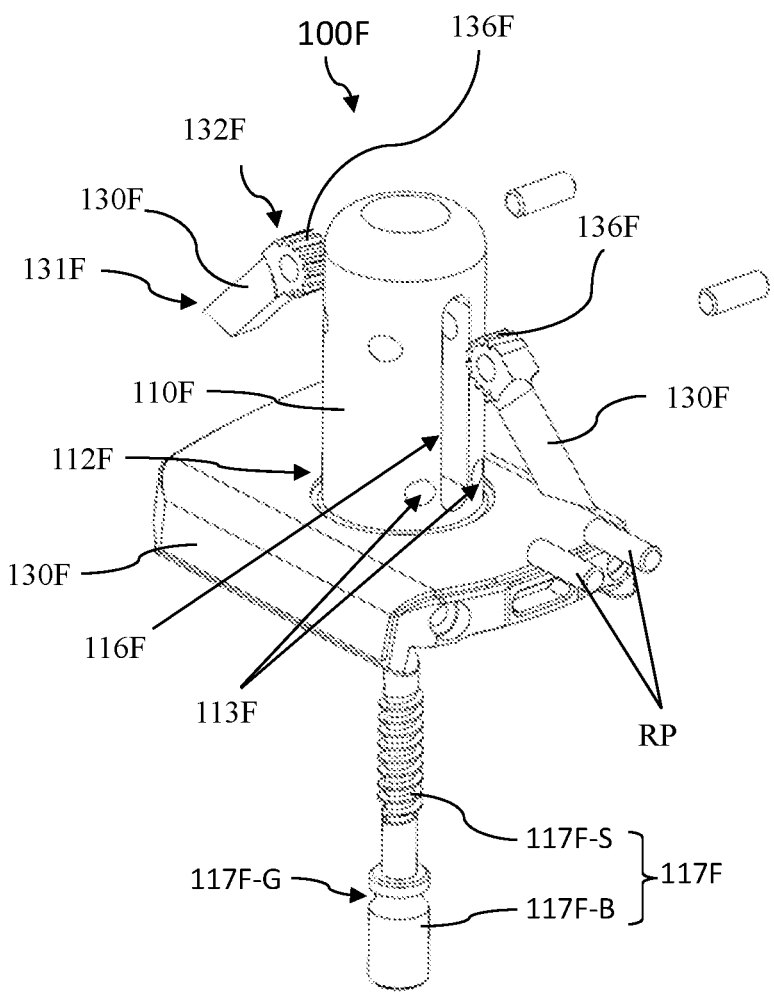
Figure 7A:
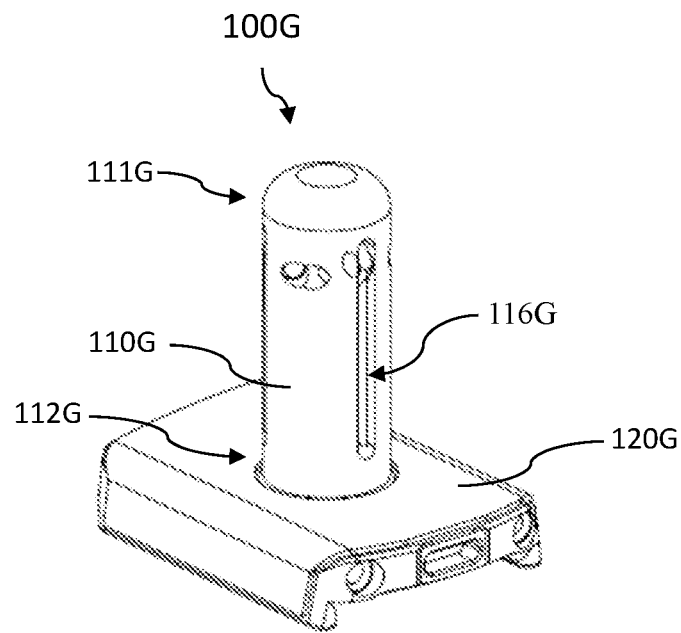
FIGS. 7A-7G are illustrations of a prosthesis according to another embodiment of the present disclosure.
Figure 7B:
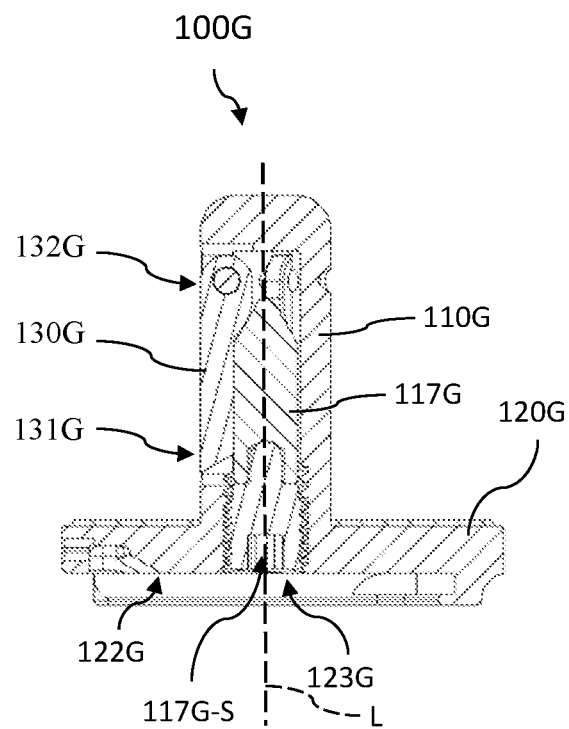
Figure 7C:
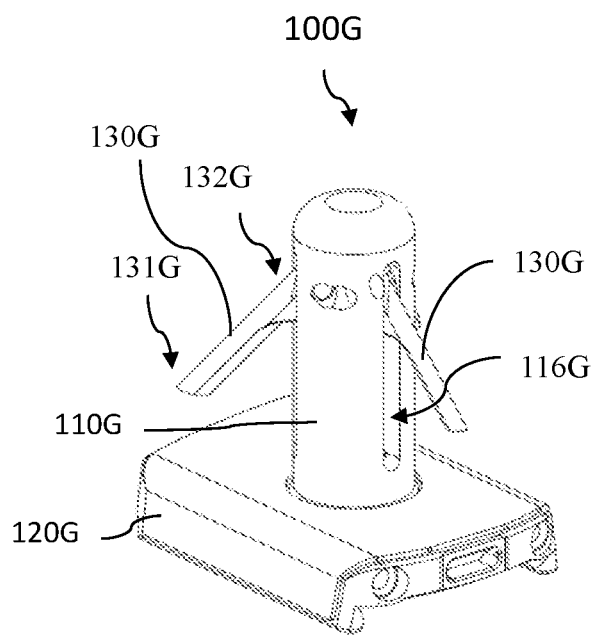
Figure 7D:
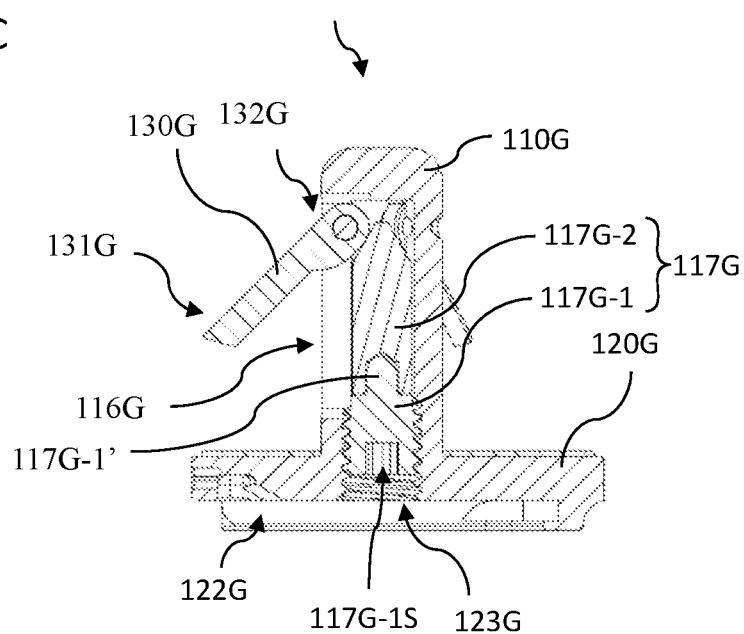
Figure 7E:
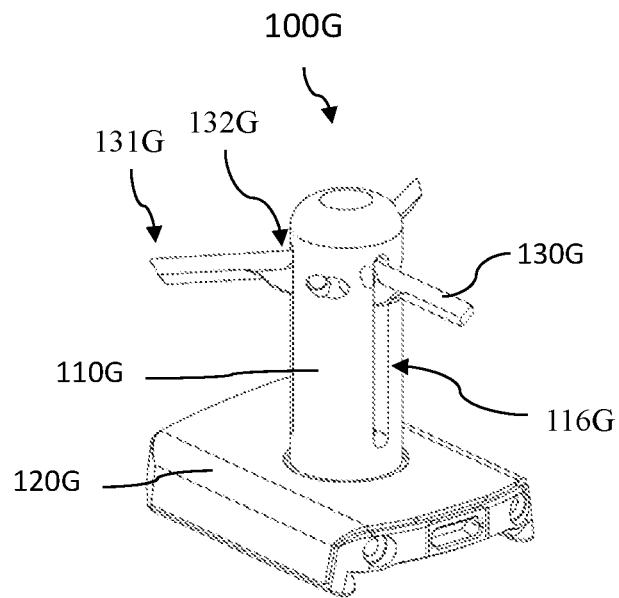
Figure 7F:
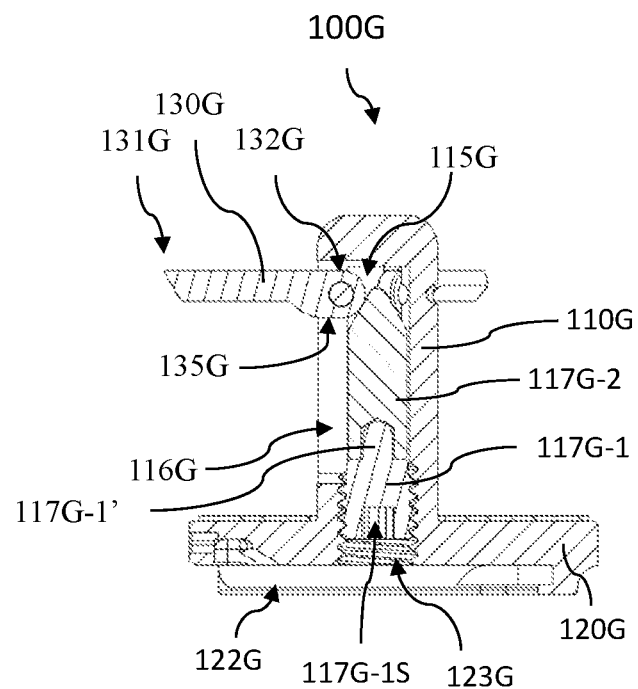
Figure 7G:
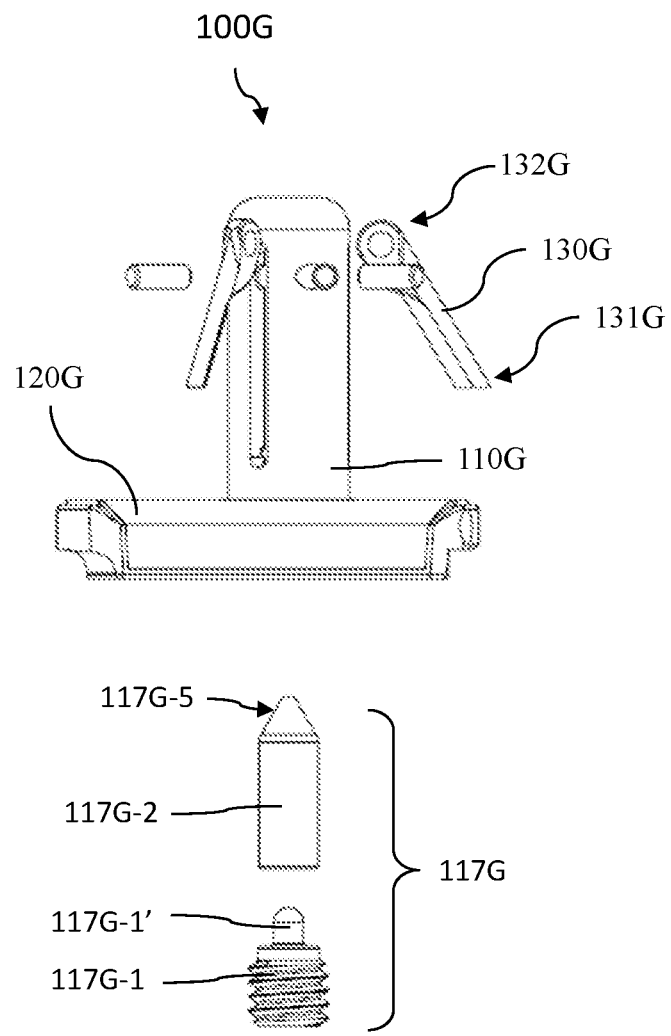
Figure 8A:
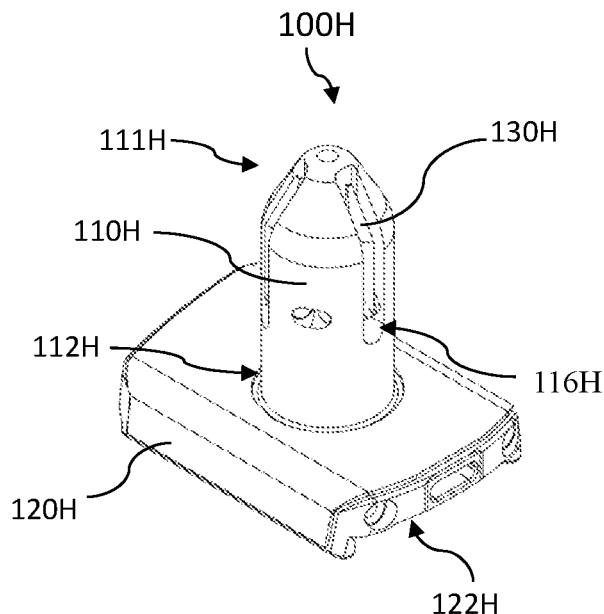
FIGS. 8A-8G are illustrations of a prosthesis according to another embodiment of the present disclosure.
Figure 8B:
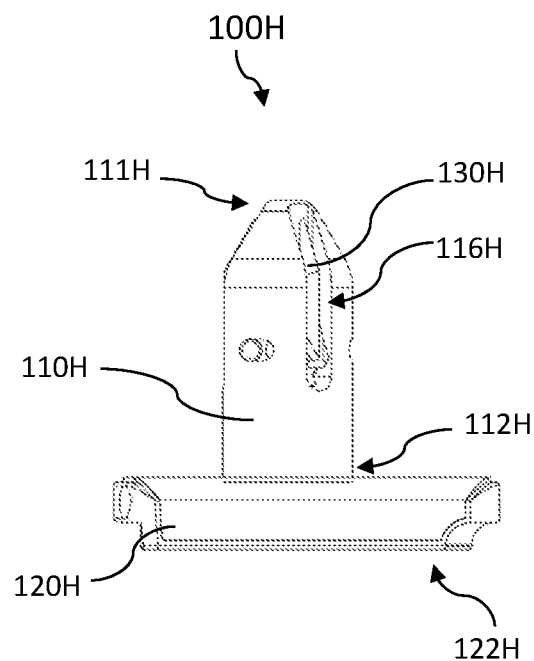
Figure 8C:
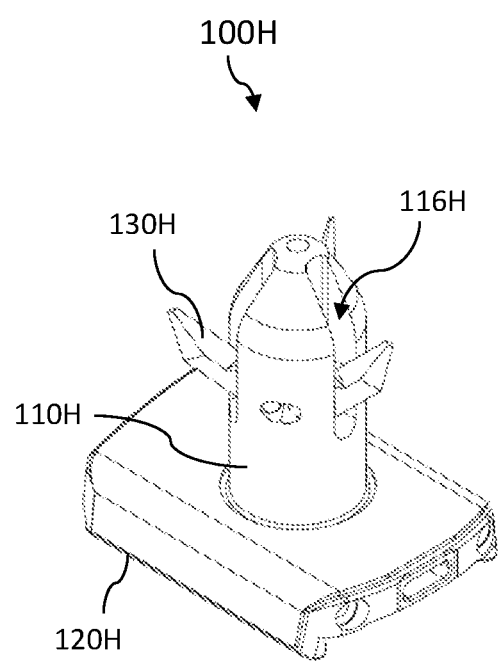
Figure 8D:
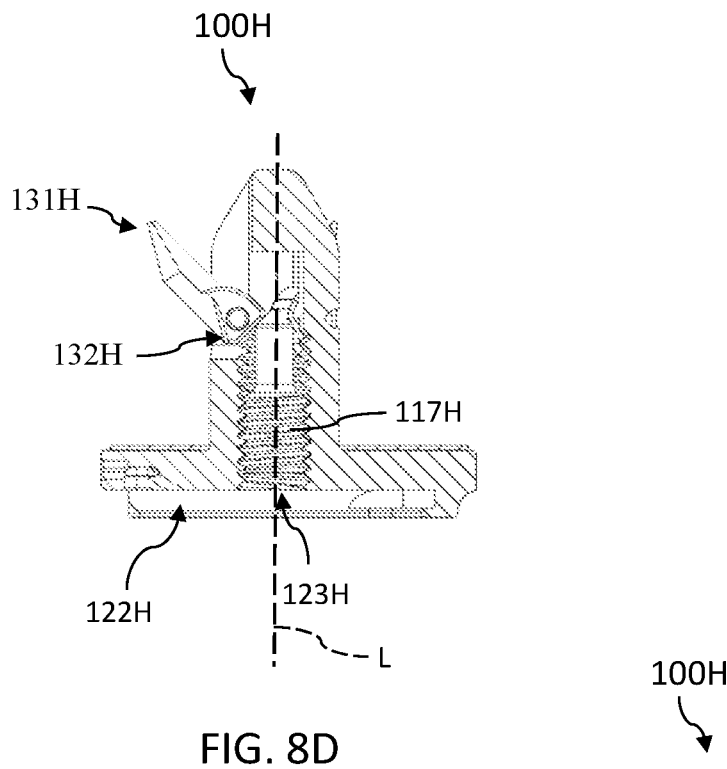
Figure 8E:
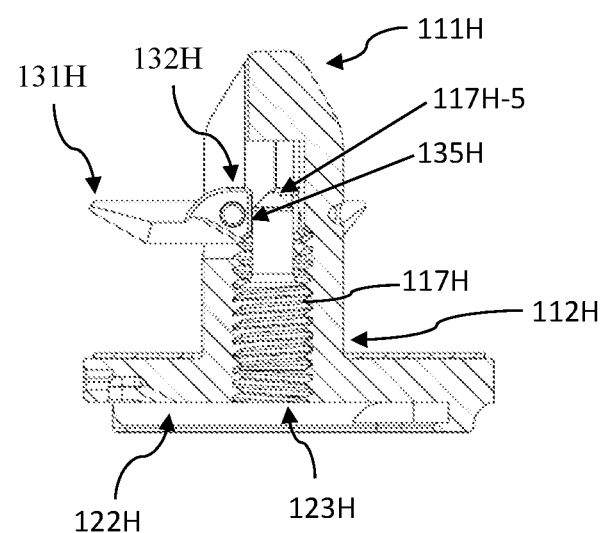
Figure 8F:
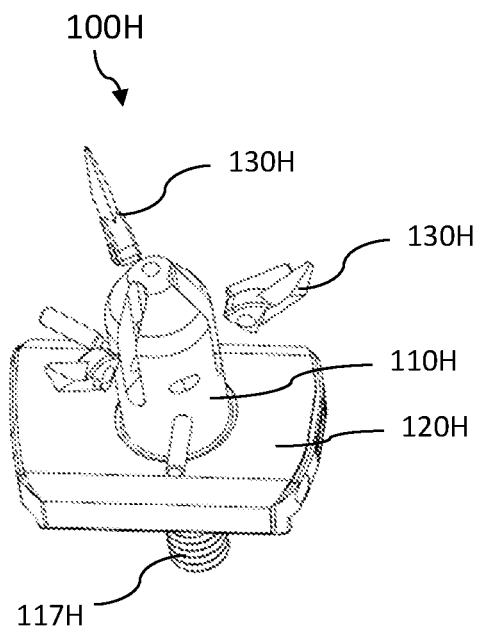
Figure 8G:
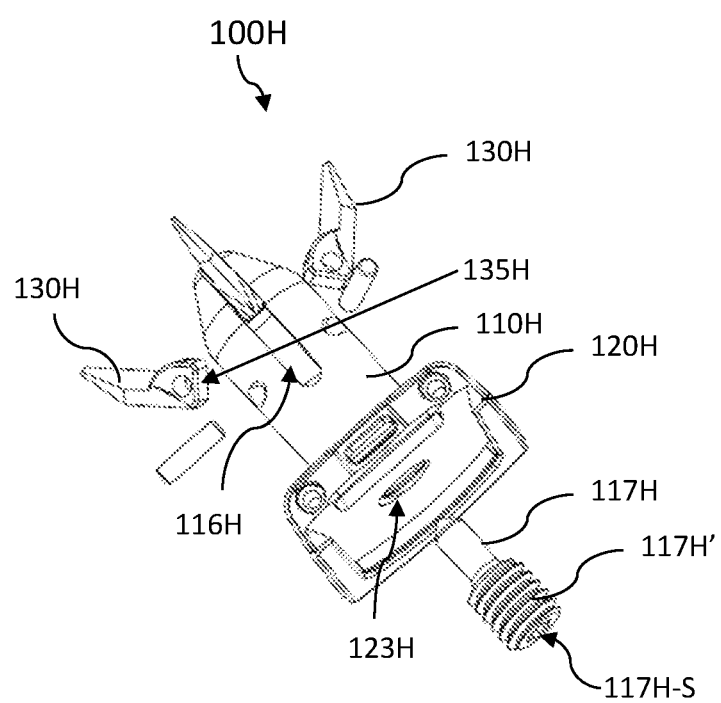

As shown in the cross-sectional views in FIGS. 6B, 6D, and 6F, the actuator 117F is positioned within the internal cavity 115F aligned with the longitudinal axis L. The actuator 117F comprises the leadscrew portion 117F-S and a base portion 117F-B. The base portion 117F-B is provided with an annular groove 117F-G for holding the actuator 117F in the internal cavity 115F while allowing it to rotate. This is achieved by a configuration similar to the way the base piece 117A-1 of the prosthesis embodiment 100A is held within its internal cavity 115A. The actuator 117F is held in place by two retaining pins RP (see FIG. 6G) inserted through two substantially parallel through holes 113F provided in the tibia stem component 110F near the trailing end 112F. The retaining pins RP engage the annular groove 117F-G from substantially the opposite sides and hold the actuator 117F in place while allowing the actuator 117F to rotate about the longitudinal axis L.

Referring to FIGS. 8A-8G, in the prosthesis embodiment 100H, the linear actuator 117H comprises externally threaded surface 117H' (See FIG. 8G) that engages the corresponding threads on the sidewall of the internal cavity 115H. By turning the linear actuator 117H clockwise or counterclockwise, the linear actuator 117H can be translated up or down within the internal cavity 115H by operation of their threaded engagement. As the linear actuator 117H moves up, the leading end of the linear actuator 117H contacts the cam surface 135H of the one or more retractable members 130H and moves the one or more retractable members 130H from their retracted position shown in FIG. 8B outward and away from the longitudinal axis L toward the fully extended position shown in FIG. 8E, and any configuration in between. The linear actuator 117H also can be provided with a tool-receiving socket 117H-S (See FIG. 8G) on the bottom end (the end near the trailing end 112H) that is accessible through the opening 123H (See FIG. 8G) at the trailing end 112H so that a tool such as a wrench, a screwdriver, etc. can be used to turn the linear actuator 117H. The one or more retractable members 130H move through the opening 116H provided in the generally cylindrical shell of the tibia stem component 110H.

In addition to the improved securement of the tibia stem component in the intramedullary canal, one additional beneficial feature of the prosthesis embodiments 100A, 100B, 100E, 100H is that the actuation direction of the one or more retractable members 130A, 130B, 130E, and 130H as they extend outward urges the tibia stem component further into the intramedullary canal. In this case, the tibial tray is drawn into the distal tibial cut surface at the ankle joint.

In the embodiments of the prosthesis 100E, 100H, the distal ends 131E, 131H of the one or more retractable members 130E, 130H extend toward the leading end 111E, 111H of the tibia stem 110E, 110H when in the retracted position.

Figure 9A:
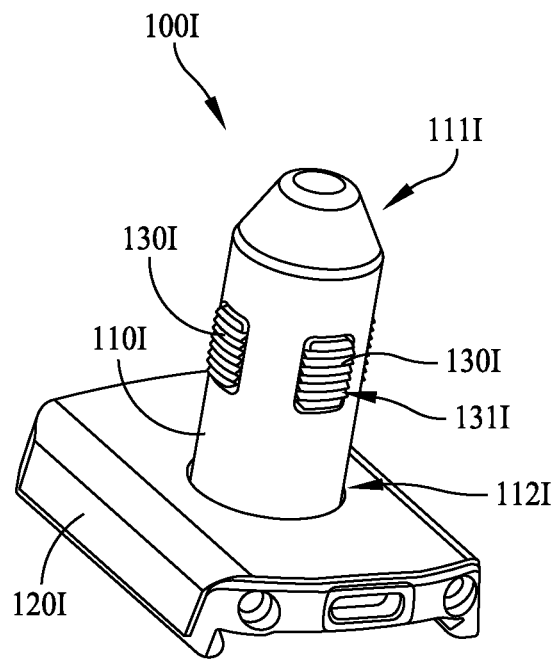
FIGS. 9A-9C are illustrations of a prosthesis according to another embodiment of the present disclosure.
Figure 9B:
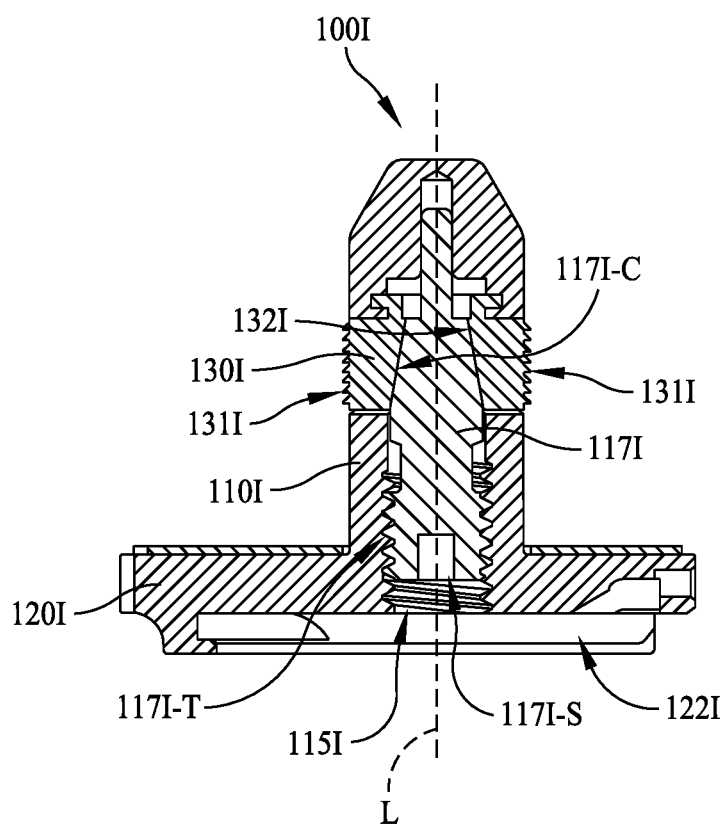
Figure 9C:
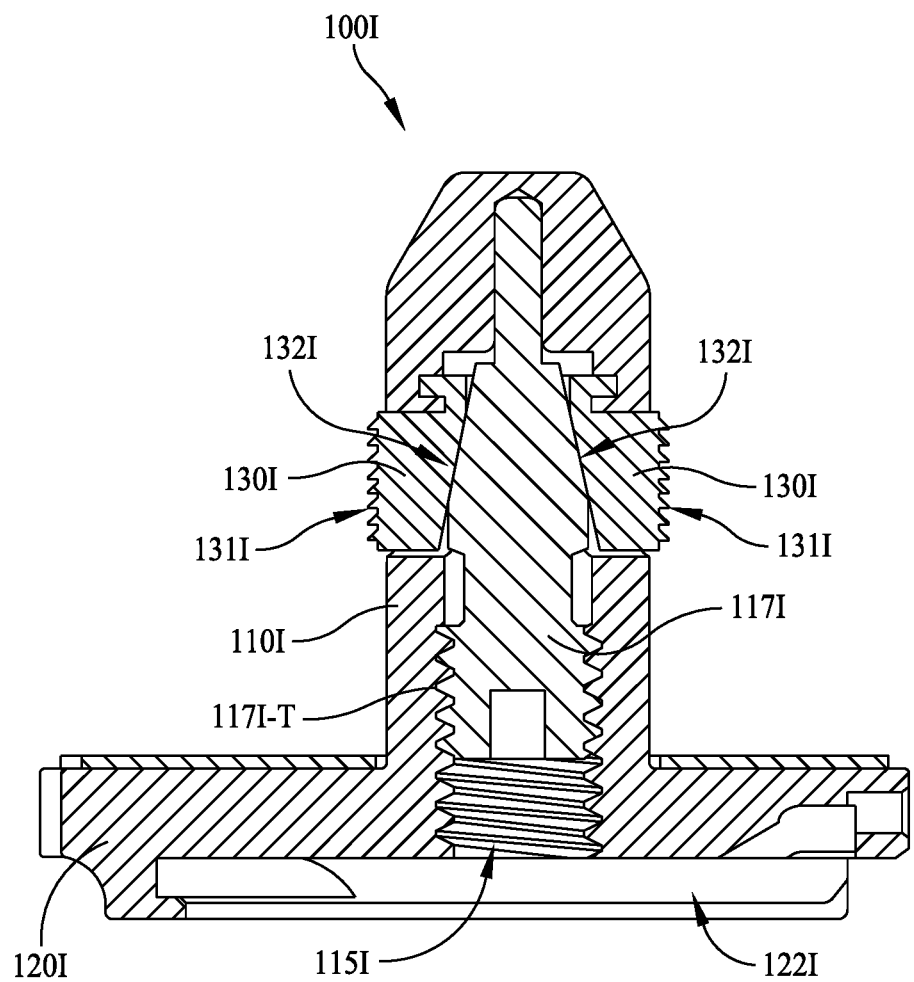

Referring to FIGS. 9A-9C, in the prosthesis embodiment 100I, the tibia stem component 110I comprises a linear actuator 117I provided within the internal cavity 115I. The linear actuator 117I is configured to be movable within the internal cavity 115I along the longitudinal axis L. The one or more retractable members 130I are moved from the retracted position shown in FIG. 9B and extended outward and away from the longitudinal axis L by translating the linear actuator 117I within the internal cavity 115I.

In some embodiments, the linear actuator 117I and the internal cavity's sidewall threadedly engage each other for translating the linear actuator 117I within the internal cavity. A portion of the linear actuator 117I is provided with male threads 117I-T and the sidewall of the internal cavity 115I is provided with corresponding female threads to achieve the threaded engagement. The bottom end of the linear actuator 117I can be configured with a tool-receiving socket 117I-S so that a tool such as a wrench or a screwdriver can be used to turn the linear actuator 117I and control the movement of the one or more retractable members 130I.

In some embodiments of the prosthesis 100I, translation of the linear actuator 117I toward the leading end 111I of the tibia stem component 110I enables the one or more retractable members 130I to extend outward.

In some embodiments of the prosthesis 100I, the linear actuator 117I comprises a leading end and a trailing end corresponding with the direction of the tibia stem's leading end 111I and trailing end 112I, and further comprises a cam engaging surface 117I-C near its leading end. Each of the one or more retractable members 130I comprises a distal surface 131I and a proximal surface 132I with respect to the longitudinal axis L of the tibia stem component, wherein the proximal surface 132I of each of the one or more retractable members 130I is a cam surface that engages the cam engaging surface 117I-C of the linear actuator. When the linear actuator 117I is translated upward toward the leading end 111I, the cam engaging surface 117I-C pushes against the cam surface 132I (i.e. the proximal surface) and enables the one or more retractable members 130I to be pushed from their retracted position shown in FIGS. 9A-9B outward and away from the longitudinal axis L toward the fully extended position shown in FIG. 9C, and any configuration in between.

In some embodiments of the prosthesis 100I, the distal surface 131I of each of the one or more retractable members 130I comprises a plurality of surface features that are configured to engage the intramedullary canal's surrounding bone and enhance anchoring the tibia stem component 110I within the intramedullary canal. In the illustrated example shown in FIGS. 9A-9B, the plurality of surface features on the distal surface 131I are teeth having a biased orientation.

Figure 9D:
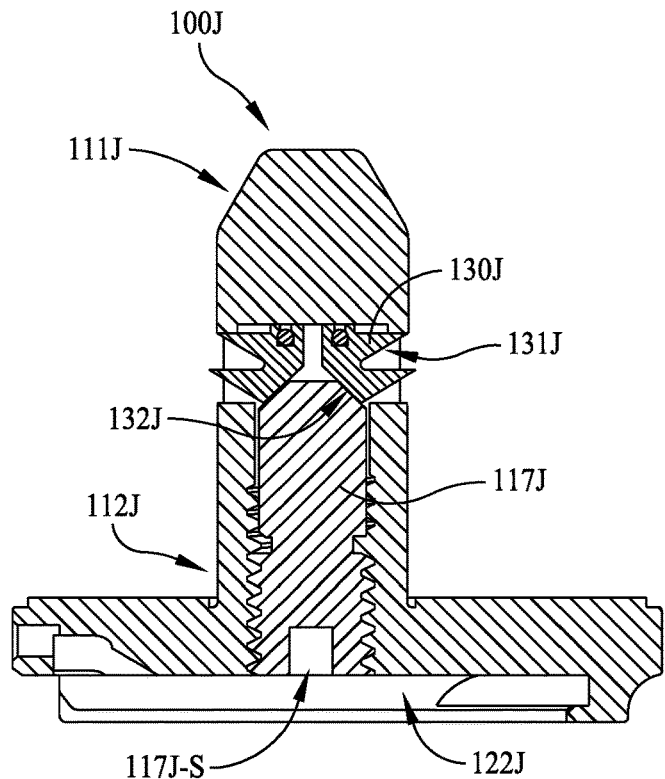
FIGS. 9D-9F are illustrations of a prosthesis according to another embodiment of the present disclosure.
Figure 9E:
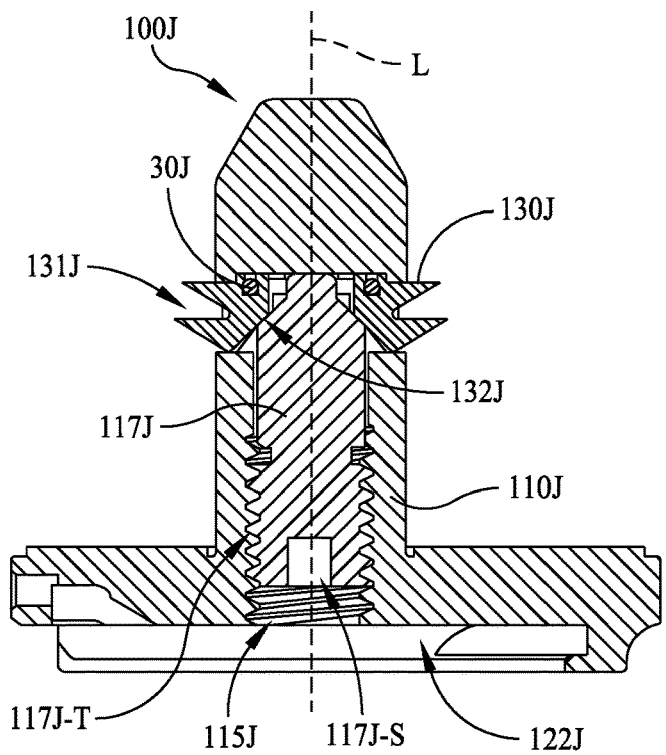
Figure 9F:
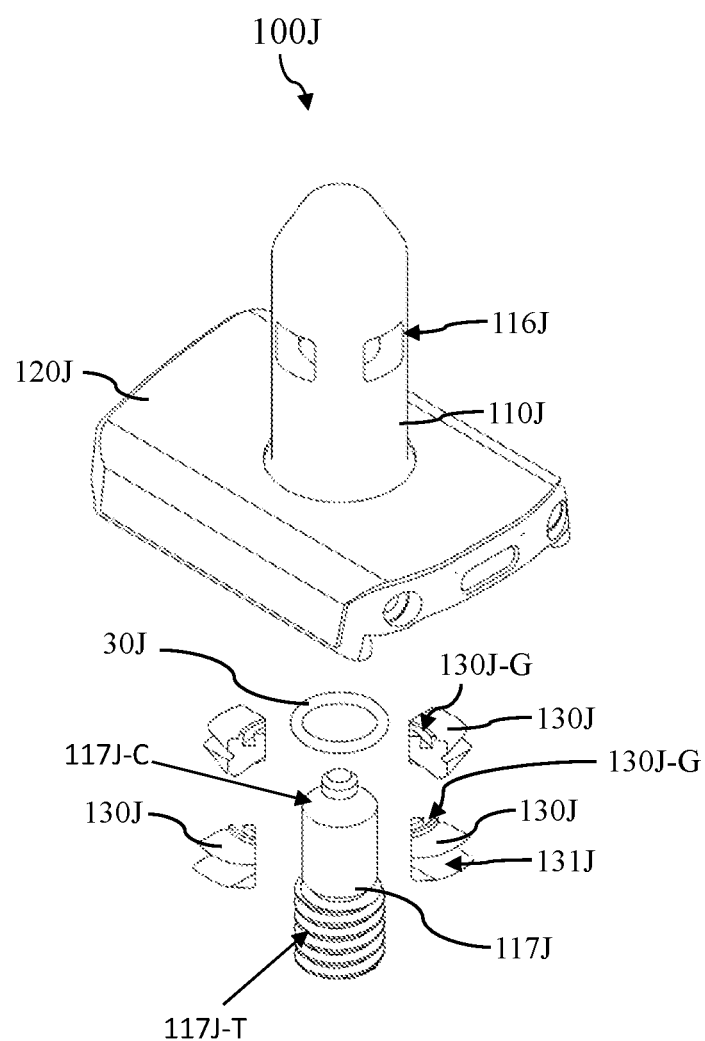

Referring to FIGS. 9D-9F, in the prosthesis embodiment 100J, the tibia stem component 110J comprises a linear actuator 117J provided within the internal cavity 115J. The linear actuator 117J is configured to be movable within the internal cavity 115J along the longitudinal axis L. Two or more retractable members 130I provided in the tibia stem component 110J are moved from the retracted position shown in FIG. 9B and extended outward and away from the longitudinal axis L by translating the linear actuator 117J within the internal cavity 115J.

In some embodiments, the linear actuator 117J and the internal cavity's sidewall threadedly engage each other for translating the linear actuator 117J within the internal cavity. A portion of the linear actuator 117J is provided with male threads 117J-T and the sidewall of the internal cavity 115J is provided with corresponding female threads to achieve the threaded engagement. The bottom end of the linear actuator 117J can be configured with a tool-receiving socket 117J-S so that a tool such as a wrench or a screwdriver can be used to turn the linear actuator 117J and control the movement of the two or more retractable members 130J.

In some embodiments of the prosthesis 100J, translation of the linear actuator 117J toward the leading end 111J of the tibia stem component 110J enables the two or more retractable members 130J to extend outward.

In some embodiments of the prosthesis 100J, the linear actuator 117J comprises a leading end and a trailing end corresponding with the direction of the tibia stem's leading end 111J and trailing end 112J, and further comprises a cam engaging surface 117J-C near its leading end. Each of the two or more retractable members 130J comprises a distal surface 131J and a proximal surface 132J with respect to the longitudinal axis L of the tibia stem component, wherein the proximal surface 132J of each of the two or more retractable members 130J is a cam surface that engages the cam engaging surface 117J-C of the linear actuator. When the linear actuator 117J is translated upward toward the leading end 111J, the cam engaging surface 117J-C pushes against the cam surface 132J (i.e. the proximal surface) and enables the two or more retractable members 130J to be pushed from their retracted position shown in FIG. 9D outward and away from the longitudinal axis L toward the fully extended position shown in FIG. 9E, and any configuration in between.

In some embodiments of the prosthesis 100J, the distal surface 131J of each of the two or more retractable members 130J comprises a plurality of surface features that are configured to engage the intramedullary canal's surrounding bone and enhance anchoring the tibia stem component 110J within the intramedullary canal. In the illustrated example shown in FIGS. 9D-9F, the plurality of surface features on the distal surface 131J are teeth having a biased orientation. Each distal surface 131J has two teeth as shown.

The two or more retractable members 130J are held together by an elastic ring 30J, such as a rubber band. (See FIGS. 9E-9F). Each of the two or more retractable members 130J are configured with a groove 130J-G (See FIG. 9F) for receiving the elastic ring 30J. The elastic ring 30J pulls the two or more retractable members 130J toward the axial center of the tibia stem component 110J and keep the retractable members 130J, particularly the cam surface 132J of the retractable members 130J, in contact with the cam engaging surface 117J-C.

In some embodiments of the prosthesis, the prosthesis can be structured similar to the embodiments 100C, 100D, 100E, 100F, 100G, 100H, except that rather than having the linear actuators 117C, 117D, 117E, 117G, and 117H that engage the one or more retractable members, an actuator (not shown) such as a rod or a stick can be inserted into the internal cavity 115C, . . . 115H via the opening 123C, . . . 123H at the trailing end 112C, . . . 112H of the tibia stem to engage and move the one or more retractable members. In such embodiments, the leading tips of the actuator would be configured similar to the linear actuators 117C, 117D, 117E, 117G, and 117H to appropriately engage the cam surfaces 135C, 135D, 135E, 135G, and 135H of the one or more retractable members.

Referring to FIGS. 10A-10F, ankle prostheses 200A, 300A according to other embodiments of the present disclosure are disclosed. The prosthesis 200A, 300A comprises: a tibia stem component 210A, 310A and a tibia tray component 220A, 320A. The tibial stem component 210A, 310A comprises a leading end 211A, 311A, a trailing end 212A, 312A and a longitudinal axis L defined therethrough. The tibia tray component 220A, 320A is generally configured to be attached to a prosthetic joint articulating surface. The tibia tray component 220A, 320A extends from the trailing end 212A, 312A of the tibia stem component 210A, 310A. The tibia stem component 210A, 310A is sized and configured to be disposed in an intramedullary canal formed in a tibia. The tibia stem component 210A, 310A is divided into two or more retractable members 230A, 330A by longitudinal slits 231A, 331A formed in the tibia stem. The longitudinal slits 231A, 331A extend from the leading end 211A, 311A of the tibia stem component and partially toward the trailing end 212A, 312A, thereby defining each of the two or more retractable members 230A, 330A between a pair of the longitudinal slits 231A, 331A. The two or more retractable members 230A, 330A have proximal ends that are joined near the trailing end 212A, 312A of the tibia stem component and distal ends 233A, 333A that are freely moveable at the leading end 211A, 311A. The two or more retractable members 230A, 330A are configured to be controllably movable from a retracted position (shown in FIGS. 10A, 10B, and 10D) and have their free distal ends 233A, 333A at the leading end 211A, 311A be bent outward and away from the longitudinal axis L. In their retracted position, the two or more retractable members 230A, 330A are parallel to the longitudinal axis L and do not extend outward. When the tibia stem component 210A, 310A is disposed in the intramedullary canal and the two or more retractable members 230A, 330A are moved outward away from the longitudinal axis L, the two or more retractable members engage the intramedullary canal's surrounding bone and enhance anchoring the tibia stem component 210A, 310A within the intramedullary canal.

Figure 10B:
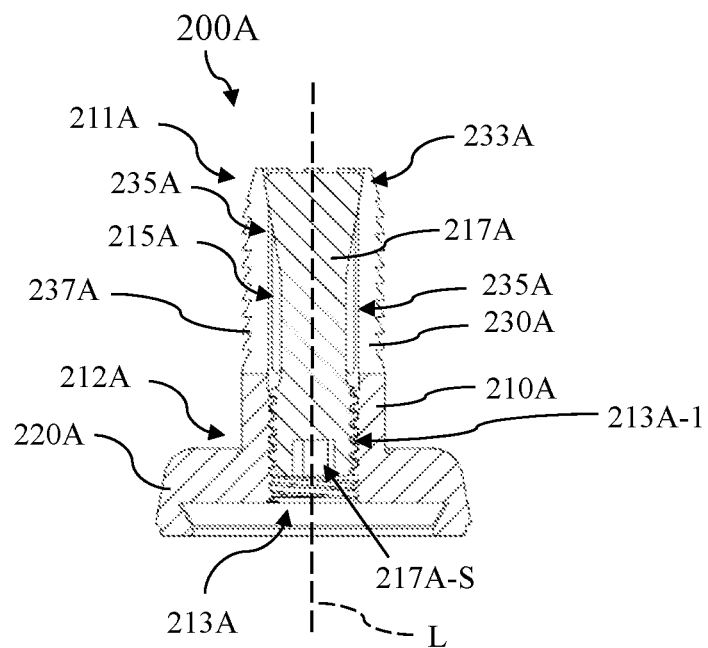

Referring to FIGS. 10B-10F, the two or more retractable members 230A, 330A define an internal cavity 215A, 315A that is open at both the leading end 211A, 311A of the tibia stem and the trailing end 212A, 312A of the tibia stem. The opening 213A, 313A at the trailing end 212A, 312A is accessible from the bottom side of the tibial tray 220A, 320A as shown in FIGS. 10B and 10F. The tibia stem 210A, 310A further comprises a linear actuator 217A, 317A provided within the internal cavity 215A, 315A. The linear actuator 217A, 317A is configured to be movable within the internal cavity 215A, 315A along the longitudinal axis L, whereby the two or more retractable members 230A, 330A are moved from the retracted position and extend outward by moving the linear actuator 217A, 317A within the internal cavity 215A, 315A.

In some embodiments, the linear actuator 217A, 317A and the internal cavity's sidewall threadedly engage each other for moving the linear actuator 217A, 317A within the internal cavity 215A, 315A. The translation of the linear actuator 217A, 317A toward the trailing end 212A, 312A of the tibia stem component enables the two or more retractable members 230A, 330A, specifically the distal ends 233A, 333A, to extend outward away from the longitudinal axis L.

Figure 10C:
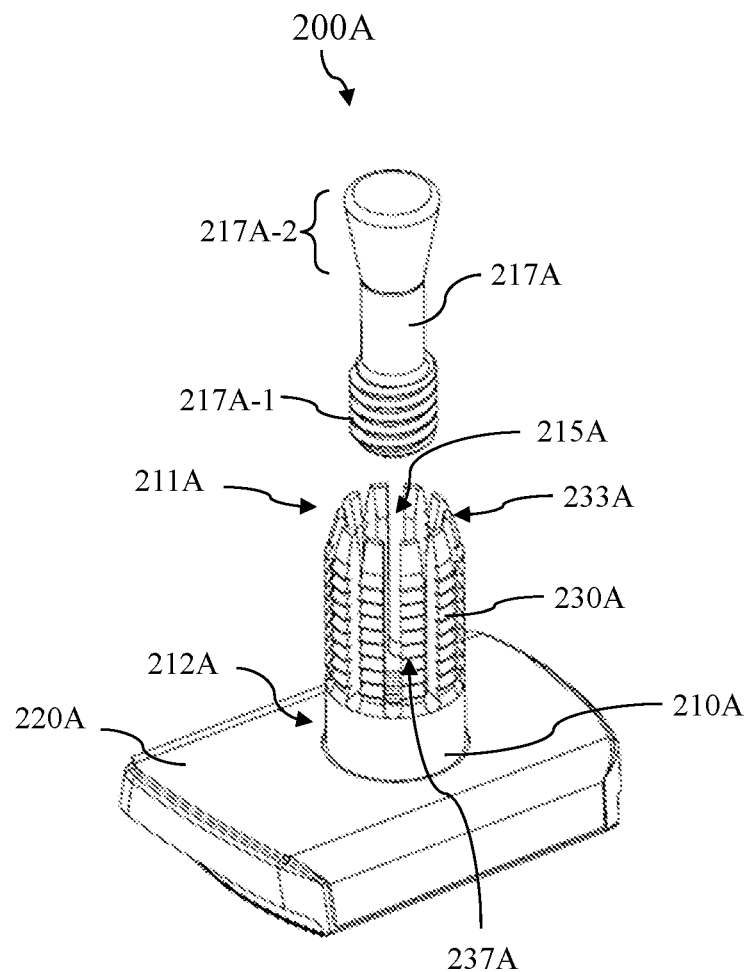
Figure 10D:
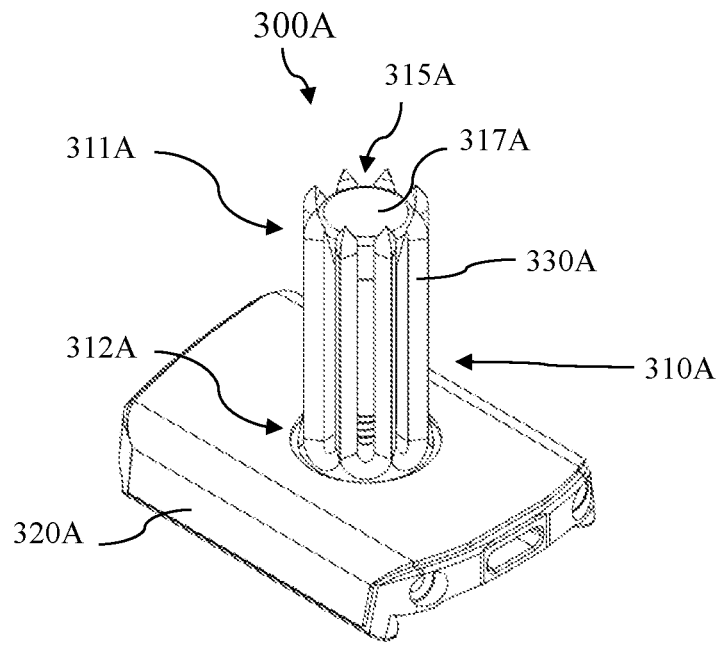
Figure 10E:
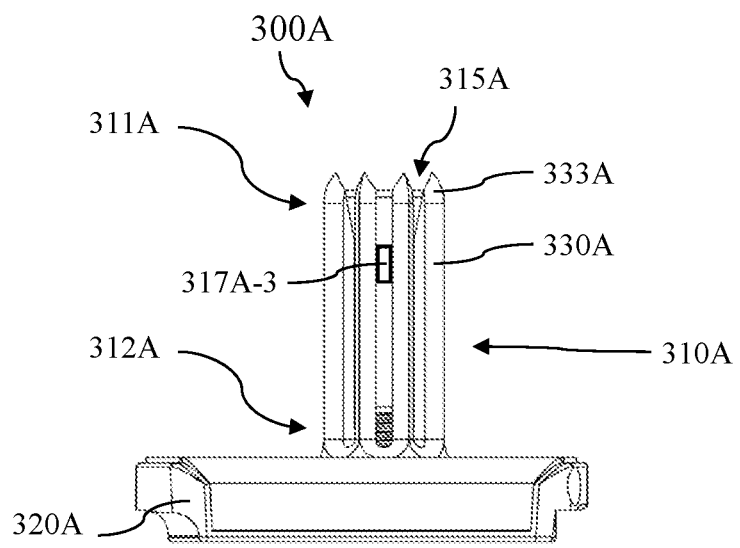

In some embodiments, the linear actuator 217A, 317A comprises a leading end and a trailing end corresponding with the direction of the tibia stem's leading end 211A, 311A and trailing end 212A, 312A, and further comprises a cam surface 217A-2, 317A-2 near its leading end. The side of each of the one or more retractable members 230A, 330A facing the internal cavity 215A, 315A engage the cam surface of the linear actuator 217A, 317A and will be referred to herein as the "cam engaging surface" 235A, 335A. (See FIG. 10B, 10G). The cam surface 217A-2, 317A-2 and the cam engaging surface 235A, 335A are configured to push the two or more retractable members 230A, 330A outward and away from longitudinal axis L when the linear actuator 217A, 317A translates toward the trailing end 212A, 312A of the tibia stem component. As can be seen in FIGS. 10B and 10C, the cam surface 217A-2, 317A-2 portion of the linear actuator 217A, 317A has an inverse frusto-conical shape so that the diameter of the distal tip of the cam surface portion is greater than the diameter of the internal cavity 215A, 315A formed by the cam engaging surfaces 235A, 335A of the two or more retractable members 230A, 330A. Thus, as the linear actuator 217A, 317A is translated downward in the orientation shown in FIG. 10B, 10G toward the trailing end 212A, 312A of the tibia stem component 210A, 320A, the cam surface portion 217A-2, 317A-2 pushes the two or more retractable members 230A, 330A outward away from the longitudinal axis L, effectively making the outside diameter of the leading end 211A, 311A of the tibia stem component larger. The distal tip 233A, 333A of the two or more retractable members 230A, 330A will move further outward as the linear actuator 217A, 317A is translated further toward the trailing end 212A, 312A. Thus, this controlled outward movement of the two or more retractable members 230A, 330A can be used to control the amount of force the two or more retractable members 230A, 330A are applying against the surrounding bone inside the intramedullary canal to secure the prosthesis inside the intramedullary canal.

In the tibia stem embodiment 200A, the linear actuator 217A comprises a threaded portion 217A-1 on its outer surface (see FIG. 10C) and the sidewall of the internal cavity 215A comprises a threaded portion 213A-1 (see FIG. 10B). Engagement of these screw threaded surfaces enables translation of the linear actuator 217A. By turning the linear actuator 217A clockwise or counter-clockwise, the linear actuator 217A can be moved up or down within the internal cavity 215A by operation of their threaded engagement. The linear actuator 217A can be provided with a tool-receiving socket 217A-S on the bottom end (the end near the trailing end 212A) that is accessible through the opening 213A (See FIG. 10B) at the bottom of the tibial tray portion 220A so that a tool such as a wrench, a screwdriver, etc. can be used to turn the linear actuator 217A.

Referring to FIGS. 10F-10H, in the tibia stem embodiment 300A, the linear actuator 317A is configured with a threaded hole 317A-1 open to its bottom end for receiving a threaded bolt 318A. The threaded bolt 318A is inserted into the threaded hole 317A-1 via a hole 313A at the bottom of the tibial tray portion 320A. Engagement of these screw threaded surfaces enables translation of the linear actuator 317A. By turning the threaded bolt 318A clockwise or counter-clockwise, the linear actuator 317A can be moved up or down by operation of their threaded engagement. The linear actuator 317A can be provided with a tool-receiving socket 317A-S on the bottom end that is accessible through the opening 313A (See FIG. 10G) at the bottom of the tibial tray portion 320A so that a tool such as a wrench, a screwdriver, etc. can be used to turn the threaded bolt 318A.

Preferably, to prevent the linear actuator 317A from turning when the threaded bolt 318A is being threaded into the linear actuator 317A, the linear actuator 317A can be provided with one or more boss 317A-3 that protrudes from the exterior of the linear actuator 317A. Each of the one or more boss 317A-3 extends between two retractable members 330A and prevents the linear actuator 317A from rotating about its longitudinal axis when the threaded bolt 318A is being turned. In other words, the one or more boss 317A-3 provides counter-torque to the linear actuator 317A. The boss 317A-3 can take a variety of shapes such as one or more ridges, splines, edges, grooves, etc. that meshes with the two or more retractable members 330A.

In some embodiments, the two or more retractable members 230A, 330A can comprise a plurality of surface features 237A that are configured to enhance the engagement with the intramedullary canal's surrounding bone and enhance anchoring the tibia stem component 210A, 310A within the intramedullary canal when the tibia stem component is disposed in the intramedullary canal and the two or more retractable members 230A, 330A are moved outward to engage the surrounding bone.

In some embodiments, the surface features 237A can be surface texturing or teeth having a biased orientation. For example, in the illustrated embodiment shown in FIGS. 10A-10C, the outer surface of the two or more retractable members 230A are provided with a plurality of teeth having a biased orientation that will resist the tibia stem component from being pulled out of the intramedullary canal. once the two or more retractable members 230A are deployed outward and the plurality of surface features 237A engage the surrounding bone in the intramedullary canal.

Referring to FIGS. 11A-11F, according to other embodiments of the present disclosure, disclosed is an ankle prosthesis 200B comprising: a tibia stem component 210B and a tibia tray component 220B. The tibial stem component 210B comprises a leading end 211B, a trailing end 212B, and a longitudinal axis L defined therethrough. The tibia tray component 220B is generally configured to be attached to a prosthetic joint articulating surface. The tibia tray component 220B extends from the trailing end 212B of the tibia stem component 210B. The tibia stem component 210B is sized and configured to be disposed in an intramedullary canal formed in a tibia. The tibia stem component 210B is divided into two or more retractable members 230B by longitudinal slits 231B (see FIGS. 11A, 11F) formed in the tibia stem component 210B. The longitudinal slits 231B extend from the leading end 211B of the tibia stem component and partially toward the trailing end 212B, thereby defining each of the two or more retractable members 230B between a pair of the longitudinal slits 231B. The two or more retractable members 230B have proximal ends that are joined near the trailing end 212B of the tibia stem component and distal ends 233B (see FIGS. 11D, 11F) that are freely moveable at the leading end 211B. The two or more retractable members 230B are configured to be controllably movable from a retracted position (shown in FIGS. 11A and 11B) to an extended position in which their free distal ends 233B at the leading end 211B be bent outward and away from the longitudinal axis L. In their retracted position, the two or more retractable members 230B are parallel to the longitudinal axis L and do not extend outward. When the tibia stem component 210B is disposed in the intramedullary canal and the two or more retractable members 230B are moved outward away from the longitudinal axis L, the two or more retractable members engage the intramedullary canal's surrounding bone and enhance anchoring the tibia stem component 210B within the intramedullary canal.

The two or more retractable members 230B define an internal cavity 215B that is open at both the leading end 211B of the tibia stem component and the trailing end 212B of the tibia stem. The internal cavity 215B can be best seen in FIG. 11F. The tibia stem component 210B further comprises a linear actuator 217B provided within the internal cavity 215B. The linear actuator 217B is configured to be movable within the internal cavity 215B along the longitudinal axis L, whereby the two or more retractable members 230B are moved from the retracted position and extend outward by moving the linear actuator 217B within the internal cavity 215B.

Figure 11D:
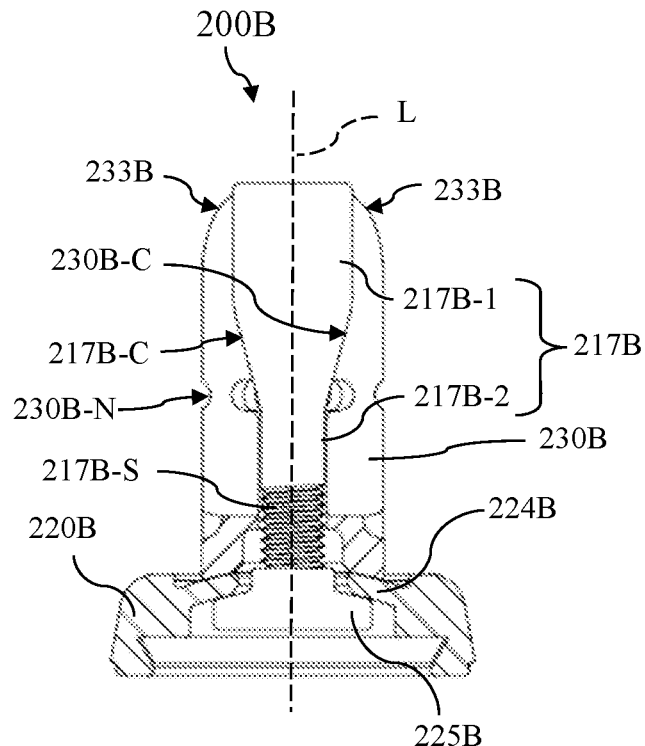
Figure 11E:
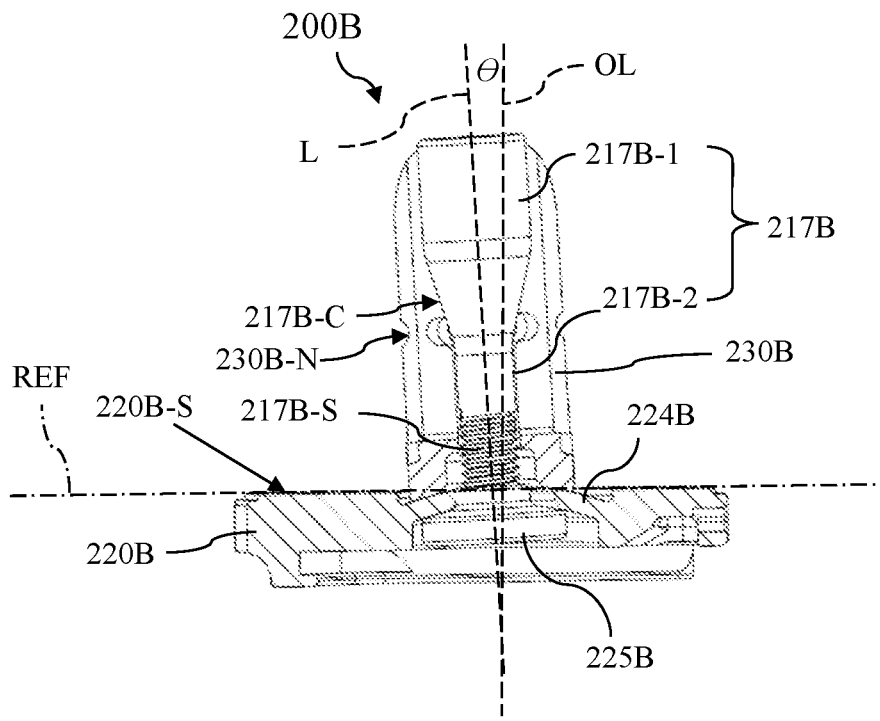
Figure 11F:
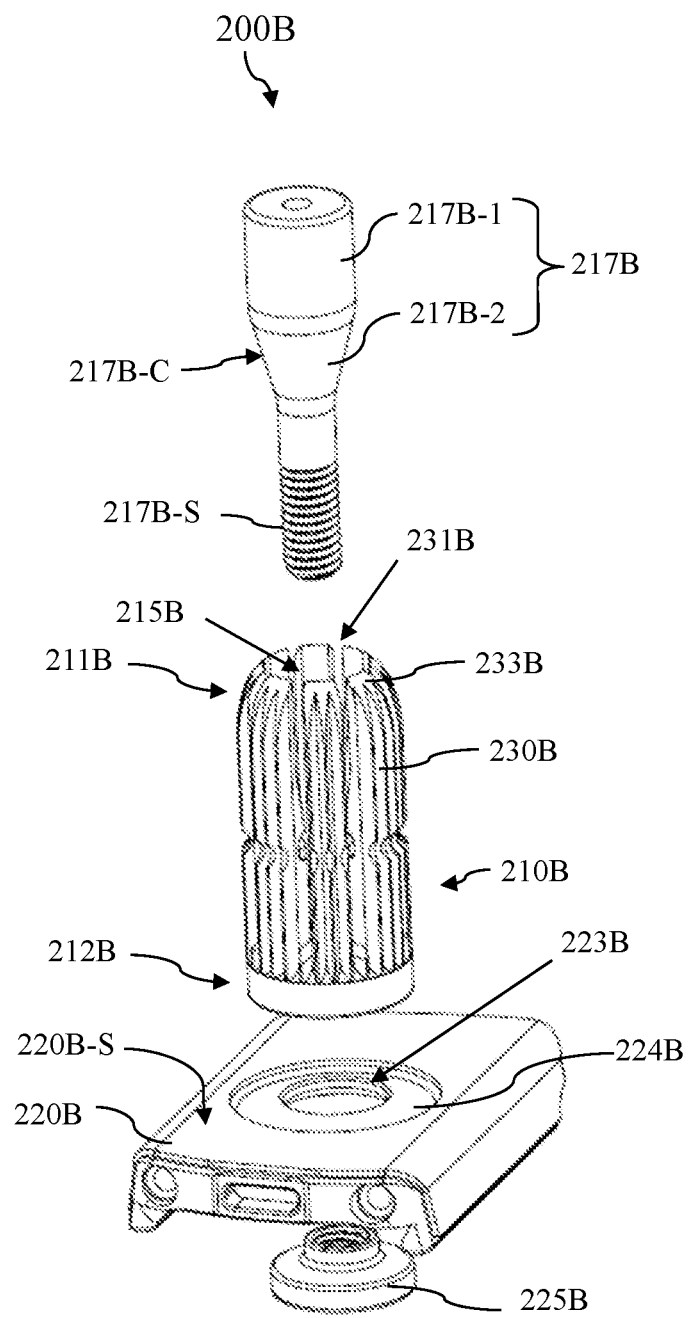
Figure 12A:
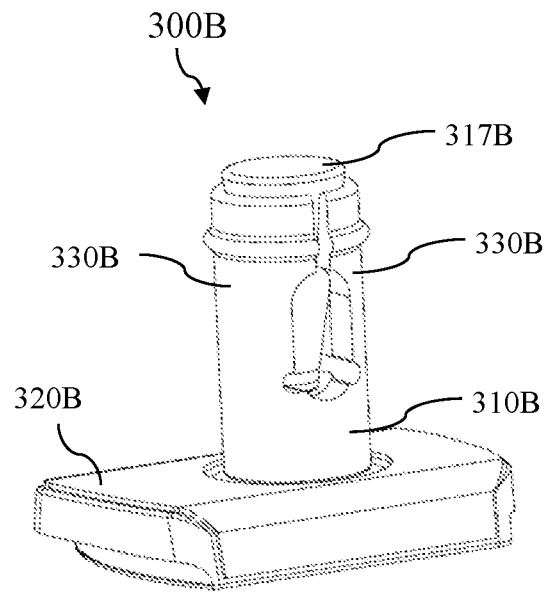
FIGS. 12A-12H are illustrations of a prosthesis according to another embodiment of the present disclosure.
Figure 12B:
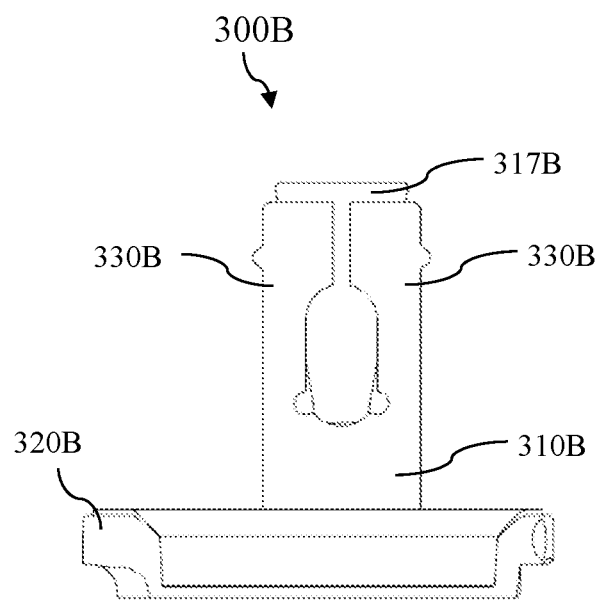
Figure 12C:
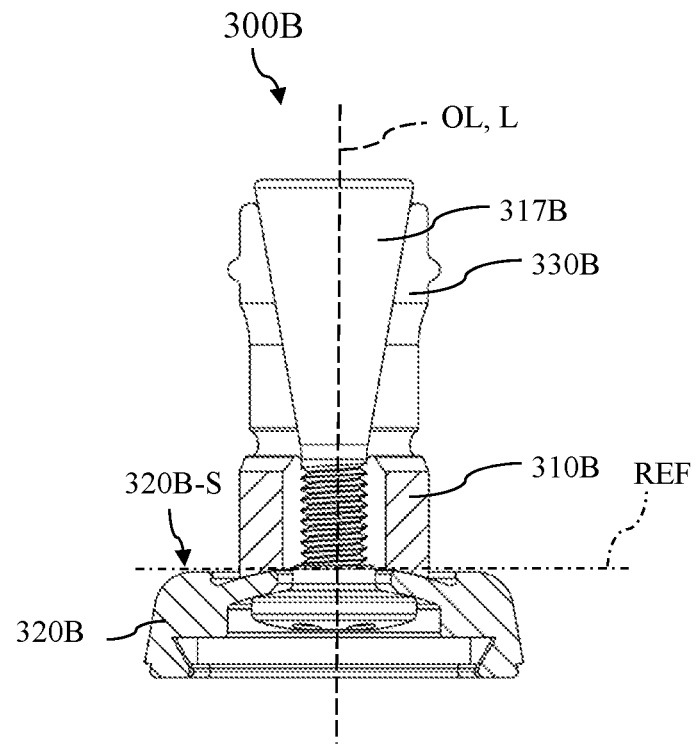
Figure 12D:
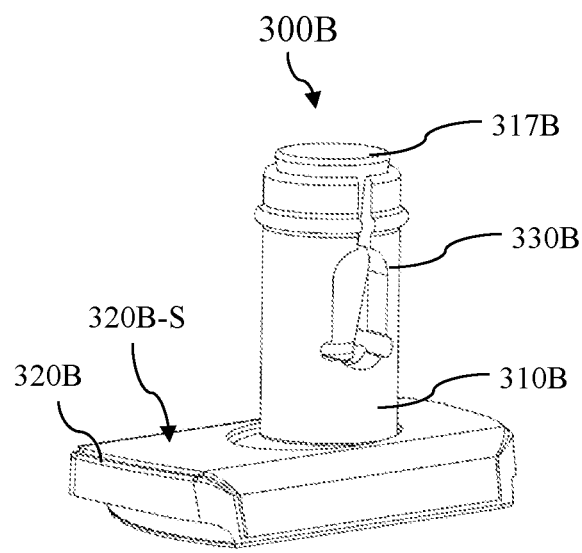
Figure 12E:
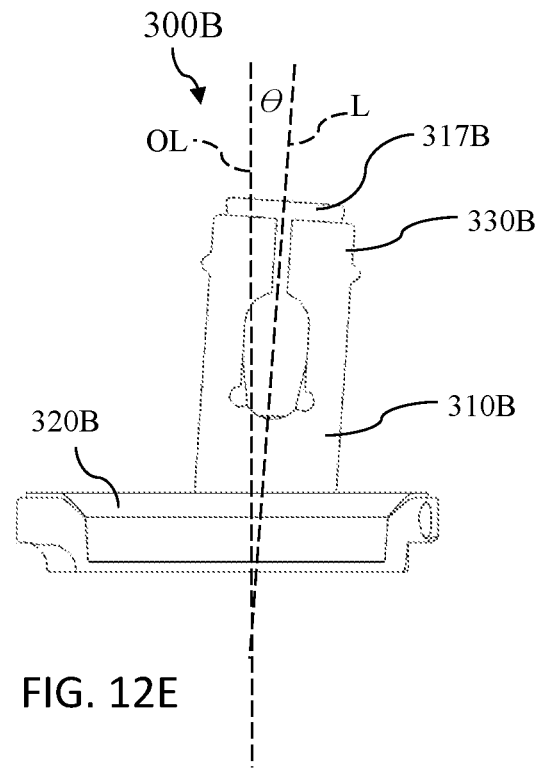
Figure 12F:
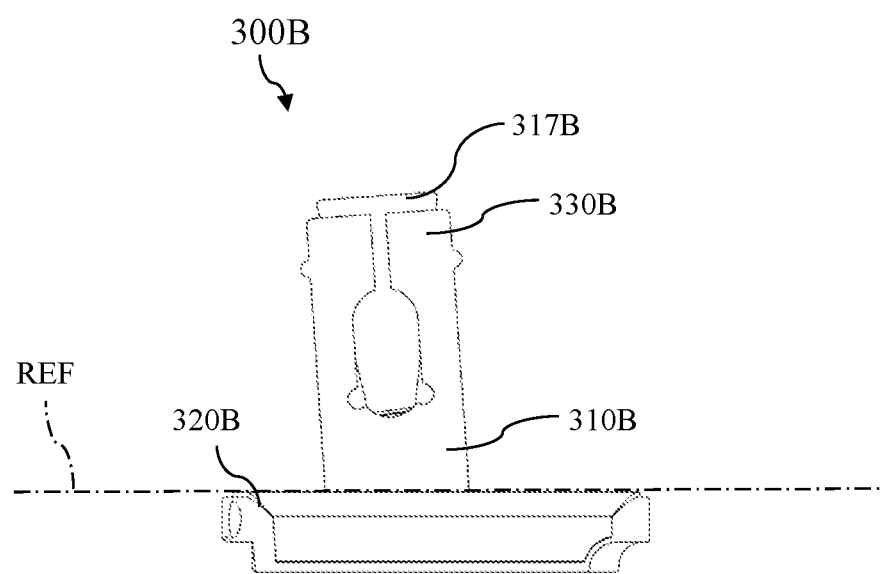
Figure 12G:
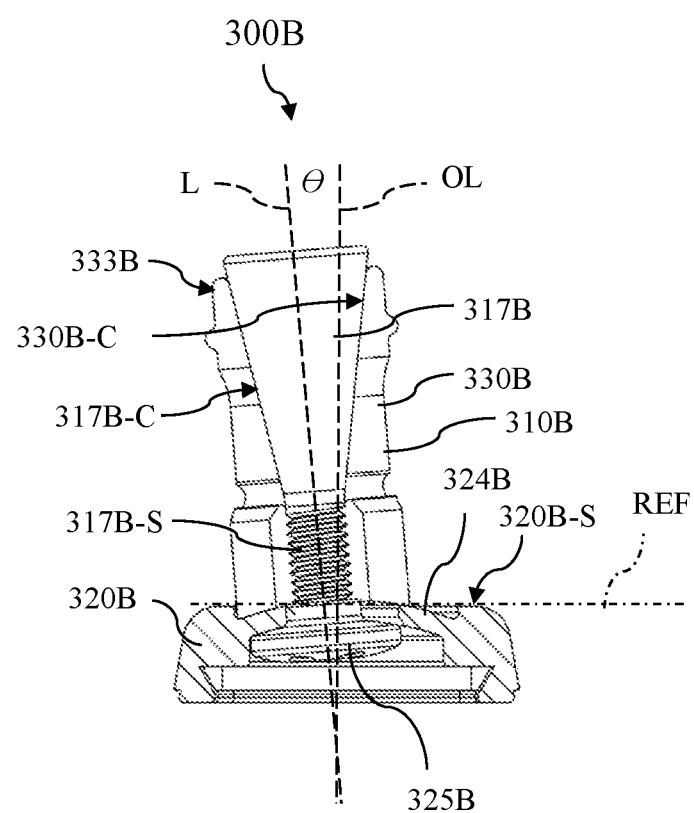
Figure 12H:
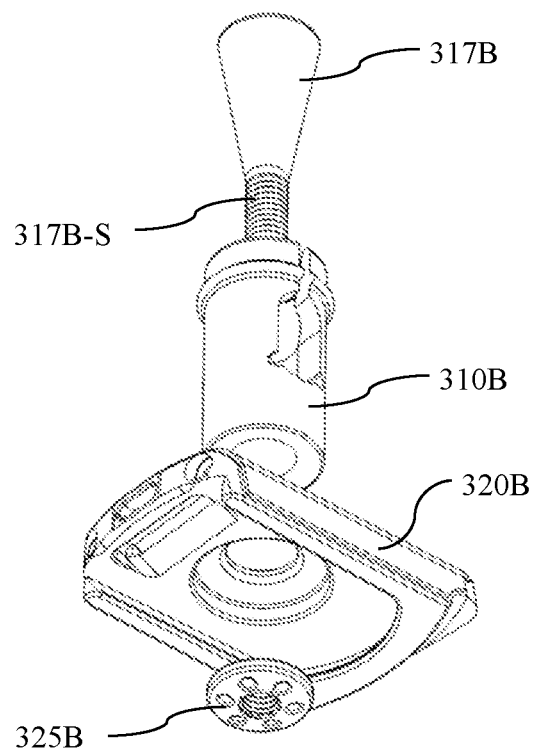

Referring to FIGS. 11D-11E, similar to the linear actuator 217A in the prosthesis 200A, the linear actuator 217B comprises a first portion 217B-1 that has a larger diameter than the remaining second portion 217B-2 and a transition portion in between that forms a cam surface 217B-C. The linear actuator 217B is situated inside the internal cavity 215B so that the first portion 217B-1 is at the leading end 211B (see FIG. 11B for the notation) of the tibia stem component. The interior sides of the two or more retractable members 230B that are facing into the internal cavity 215B are configured so that when the linear actuator 217B is translated downward toward the trailing end 216B of the tibia stem component 210B, the large diameter first portion 217B-1 interacts with the two or more retractable members 230B to push them outward and away from the longitudinal axis L.

In some embodiments, the contour of the interior sides of the two or more retractable members 230B are configured so that the diameter of the internal cavity 215B matches the reducing diameter of the linear actuator 217B going from the leading end 211B to the trailing end 212B. Thus, the interior surface of each of the two or more retractable members 230B comprise a cam engaging surface 230B-C that correspond to the cam surface 217B-C. This configuration is illustrated in FIGS. 11D-11E. Then, starting from the retracted configuration for the two or more retractable members 230B shown in FIGS. 11D-11E, when the linear actuator 217B is translated downward toward the trailing end 212B, the cam surface 217B-C and the cam engaging surface 230B-C operate on one another to push the two or more retractable members 230B outward and away from the longitudinal axis L.

The distal tip 233B of the two or more retractable members 230B will move further outward as the linear actuator 217B is translated further toward the trailing end 212B. Thus, this controlled outward movement of the two or more retractable members 230B can be used to control the amount of force the two or more retractable members 230B are applying against the surrounding bone inside the intramedullary canal to secure the prosthesis inside the intramedullary canal.

Referring to FIGS. 11A-11E, because the lower portion (i.e., closer to the trailing end 212B) of the two or more retractable members 230B becomes thicker as the diameter of the internal cavity 215B becomes smaller, this increase in thickness can hinder the ability for the retractable members 230B to flex or bend outward. This can be especially true if the two or more retractable members 230B are made of stiff material. Therefore, in some embodiments, each of the two or more retractable members 230B can be provided with one or more thinner necked regions 230B-N to tune the flexibility of the retractable members 230B to achieve either plastic or elastic deformation that would be suitable to the material, size, and anatomical application. Such necked regions 230B-N can be created by cutouts on the exterior and/or interior sides of the retractable members 230B.

The translation of the linear actuator 217B is achieved by the use of a base nut 225B. (See FIGS. 11D, 11E, and 11F). The tibia tray component 220B in this embodiment comprises a hole 223B that aligns with the internal cavity 215B so that the threaded portion 217B-S of the linear actuator 217B can be extended downward and through the hole 223B. The base nut 225B is threaded onto the threaded portion 217B-S from the bottom side of the tibia tray component 220B. Surrounding the hole 223B is a flange 224B (See FIG. 11F) and by tightening the base nut 225B the flange 224B is captured between the base nut 225B and the tibia stem component 210B. Thus, with the base nut 225B braced against the flange 224B, turning the base nut 225B and engaging the threaded portion 217B-S will pull the linear actuator 217B downward toward the trailing end 211B. This downward motion causes the stem component 210b to expand circumferentially, applying a hoop-like stress to the surrounding bone and embedding the implant. In one embodiment, the retractable members 230B are configured and arranged to bend within their elastic deformation range for the implant material of choice. Keeping the design within the elastic deformation range allows the retractable members 230B to spring back to the original position and allow for easy implant removal out of bone forming the intramedullary canal.

Polyaxial Feature

According to some embodiments, the tibial stem component and the tibial tray component of the ankle prosthesis can be configured to be modular pieces so that the angle between the two components can be adjusted to be within a range of angles rather than being fixed to one configuration. Some examples of such ankle prosthesis are disclosed with the accompanying illustrations in FIGS. 11A-12I.

In some embodiments, the ankle prosthesis 200B, 300B comprises a tibia stem component 210B, 310B and a tibia tray component 220B, 320B. The tibia stem component comprises a leading end 211B, 311B, a trailing end 212B, 312B, and a longitudinal axis L defined therethrough. The tibia tray component 220B, 320B comprises a surface 220B-S, 320B-S defining a reference plane REF (see FIG. 11E, 12F, 12G). The tibia stem component and the tibia tray component are modular and the tibia tray component 220B, 320B and the trailing end of the tibia stem component 210B, 310B are configured to form a joint wherein the tibia stem component's relative angle with respect to the reference plane REF can be adjusted so that the longitudinal axis L of the tibia stem component 210B, 310B forms an angle θ (see FIG. 11E) with an orthogonal OL of the reference plane REF, wherein the angle θ can be between 0 degrees up to and including 45 degrees.

In one embodiment, the angle θ can range between 0 degrees up to and including 40 degrees. In one embodiment, the angle θ can range between 0 degrees up to and including 30 degrees. In one embodiment, the preferred angle θ can range between 0 degrees up to and including 20 degrees. In other joints of the body, this angular adjustability may be adjusted between 0 and 90 degrees, and as is suitable to the anatomy. The angular range is configured and arranged to suit the implant's size as well as anatomical considerations. In one embodiment, not shown, the angular range may be limited by flat faces in the apparatus's ball joint which limit angular motion in one plane differently than in another plane. This includes a uni-planar adjustable design which may allow for more angular adjustment in the anterior-posterior direction (sagittal plane) while limiting angular motion in medial lateral direction (coronal).

The tibia stem component 210B, 310B is sized and configured to be disposed in an intramedullary canal formed in a tibia. The tibia stem component comprises: two or more retractable members 230B, 330B, configured to be controllably movable from a retracted position and be extended outward and away from the longitudinal axis L. In the retracted position, the two or more retractable members 230B, 330B are contained substantially within the silhouette of the tibia stem component and do not extend outward. When the tibia stem component is disposed in the intramedullary canal and the one or more retractable members 230B, 330B are extended outward, the one or more retractable members engage the intramedullary canal's surrounding bone and enhance anchoring the tibia stem within the intramedullary canal.

The adjustable joint formed between the tibial stem component 210B, 310B and the tibial tray component 220B, 320B can be secured to fix the angle θ at a desired angle between the above-mentioned range between 0 degrees up to and including 45 degrees. The tibia tray component 220B, 320B is configured with a recess 224B, 324B on the top surface 220B-S, 320B-S of the tibia tray component 220B, 320B for receiving the trailing end 212B, 312B of the tibia stem component 210B, 310B. The bottom of the recess 224B, 324B is configured with a convex surface to receive the trailing end 212B, 312B of the tibial stem component 210B, 310B and allow the tibia stem component 210B, 310B to swivel against the convex surface to adjust the angle θ to a desired angle.

Once the desired angle θ is achieved, the position of the tibia stem component 210B, 310B can be locked by threading the locking nut 225B, 325B onto the threaded portion 217B-S, 317B-S of the linear actuator 217B, 317B. The locking nut 225B, 325B captures the flange 224B, 324B between the locking nut 225B, 325B and the tibia stem component 210B, 310B and tightening the locking nut 225B, 325B locks the assembly's configuration. In some embodiments, supplemental locking features can be used in conjunction with the locking nut 225B, 325B to enhance the locking function. Such supplemental locking features can be in the form of nylon washers, locking washers, distorted thread nuts, serrated face nuts, or other locking nut/washer combinations. In some embodiments, Spiralock® thread forms by Stanley® Engineering Fastening can be used.

This polyaxial adjustment feature allows the prosthesis to be adjusted to the variations in the patients' physiology during the ankle prosthesis implantation surgical procedure.

Some Material Considerations

In some embodiments, the tibia stem components 210A, 310A, and 210B of the prostheses 200A, 310A, and 200B, respectively, can be made of a memory metal alloys such as Nitinol so that the superelastic properties or the memory properties of such alloy can be employed to enhance the function of the two or more retractable members 230A, 330A, and 230B.

Figure 13A:
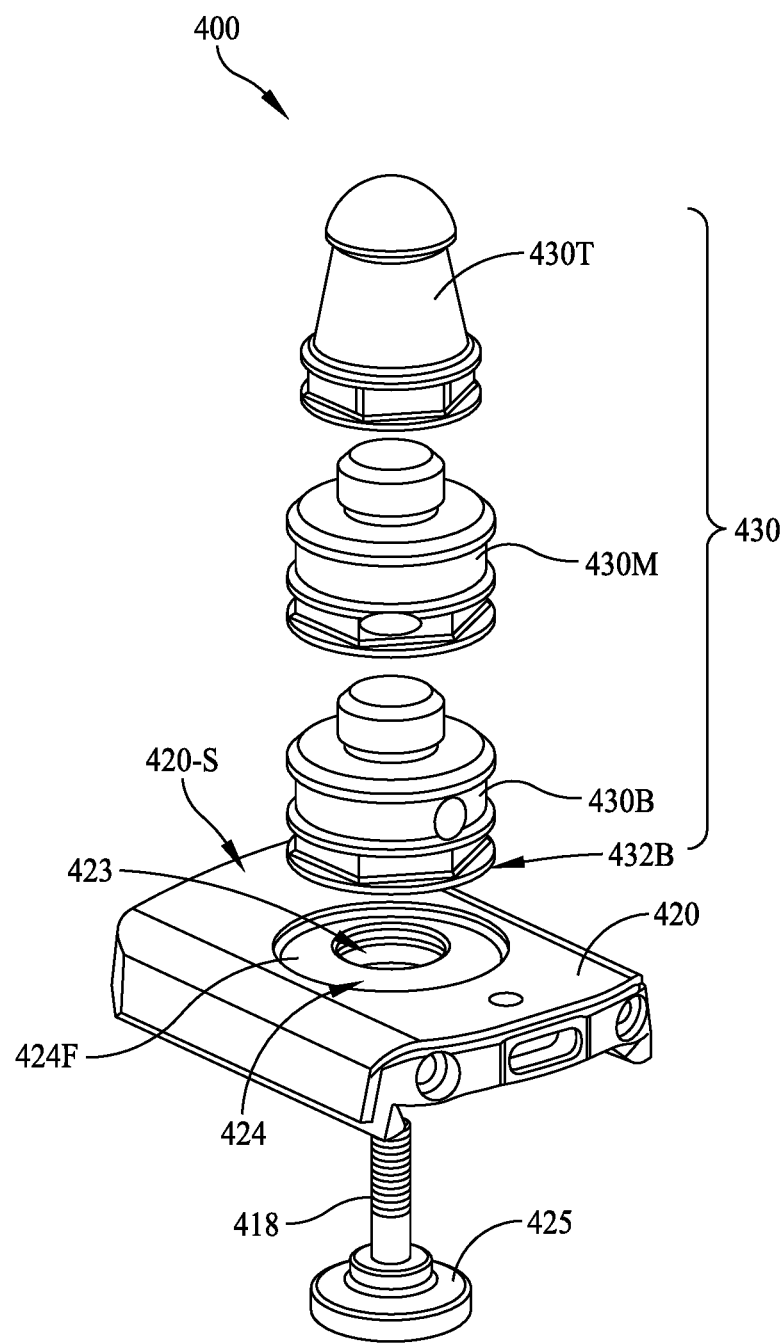
FIGS. 13A-13B are illustrations of a prosthesis according to another embodiment of the present disclosure.
Figure 13B:
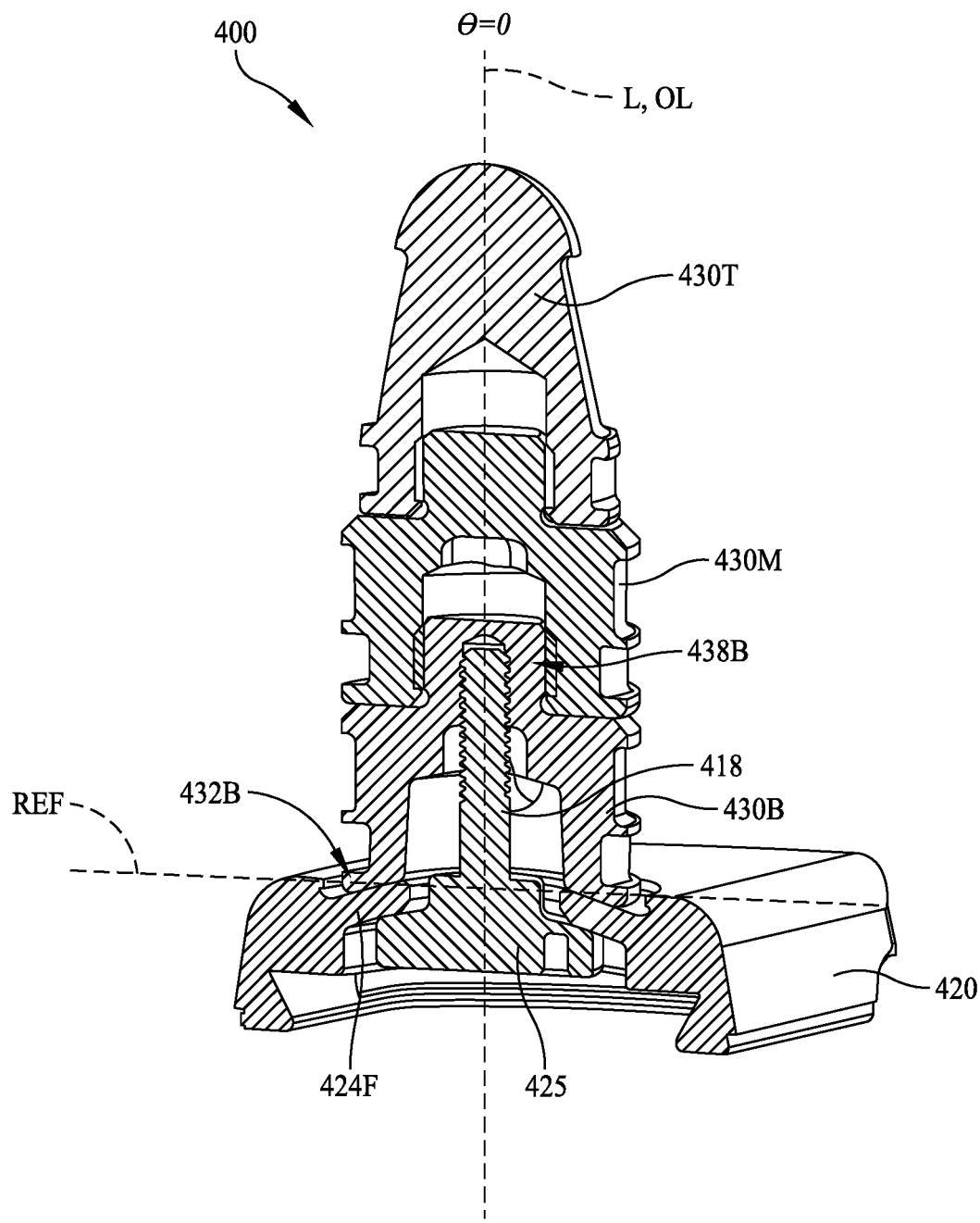

The polyaxial adjustment feature can also be applied on tibia stem prostheses that comprise stackable modular tibia stem components, for example, the tibia stem components in Wright Medical's Inbone™ Total Ankle System. An example of such tibia stem prosthesis 400 is illustrated in FIGS. 13A-13B. In some embodiments, the ankle prosthesis 400 comprises a tibia stem component 430 and a tibia tray component 420. The tibia stem component can comprise two or more modular stem pieces that are configured to be stacked and securely engage to each other. The two or more modular stem pieces can include a base stem component 430B, a top stem component 430T, and one or more middle stem component 430M. The modular stem pieces can be threaded into each other. The modular configuration of the tibia stem 430 allows the surgeon to configure different lengths for the tibia stem based on the condition and dimension of the patient's tibia. The diameter of the modular stem pieces can be varied also.

In the illustrated example, the tibia stem component 430 includes three modular pieces: the base stem component 430B, the middle stem component 430M, and the top stem component 430T. The base stem component 430B is configured to form a joint wherein the base stem component's relative angle with respect to the reference plane REF can be adjusted so that the longitudinal axis L of the base stem component 430B forms an angle θ (see FIG. 13B) with an orthogonal OL of the reference plane REF, wherein the angle θ can be between 0 degrees up to and including 45 degrees. In the configuration illustrated in FIG. 13B, the angle θ is 0. The reference plane REF is defined by a surface 420-S that is on the proximal side (in the orientation of the tibia tray 420 as installed on to the prepared distal end of the patient's tibia) of the tibia tray component 420.

In one embodiment, the angle θ can range between 0 degrees up to and including 40 degrees. In one embodiment, the angle θ can range between 0 degrees up to and including 30 degrees. In one embodiment, the preferred angle θ can range between 0 degrees up to and including 20 degrees. In other joints of the body, this angular adjustability may be adjusted between 0 and 90 degrees, and as is suitable to the anatomy. The angular range is configured and arranged to suit the implant's size as well as anatomical considerations. In one embodiment, not shown, the angular range may be limited by flat faces in the apparatus's ball joint which limit angular motion in one plane differently than in another plane. This includes a uni-planar adjustable design which may allow for more angular adjustment in the anterior-posterior direction (sagittal plane) while limiting angular motion in medial lateral direction (coronal).

The adjustable joint formed between the base stem component 430B and the tibia tray component 420 can be secured to fix the angle θ at a desired angle between the above-mentioned range between 0 degrees up to and including 45 degrees. The tibia tray component 420 is configured with a recess 424 on the top surface 420-S of the tibia tray component 420 for receiving a trailing end 432B of the base stem component 430B. The bottom of the recess 424 is configured with a convex surface to receive the trailing end 432B of the base stem component 430B and allow the assembled tibia stem component 430 to swivel against the convex surface to adjust the angle θ to a desired angle. The convex surface at the bottom of the recess 424 is convex in the proximal direction.

Once the desired angle θ is achieved, the position of the tibia stem component 430 can be locked by threading a locking bolt 425 into the base stem component 430B from the distal side of the tibia tray 420 through a hole 423 that is provided in the convex surface of the recess 424. The convex surface forms an annular flange 424F around the hole 423. The locking bolt 425 comprises a head portion and a threaded shaft portion 418. The threaded shaft portion 418 has a male-type threads and the base stem component 430B is configured with a corresponding female type threaded hole 438B for receiving the threaded shaft portion 418.

As shown in the longitudinal cross-sectional view in FIG. 13B, the head portion of the locking bolt 425 is larger than the diameter of the hole 423 and captures the flange 424F between the head portion of the locking bolt 425 and the base stem component 430B and tightening the locking bolt 425 locks the assembly's configuration. The locking bolt 425 threadedly engages the trailing end of the tibial stem component 430 from the distal surface of the tibia tray to lock the joint at the angle θ.

In some embodiments, supplemental locking features can be used in conjunction with the locking bolt 425 to enhance the locking function. Such supplemental locking features can be in the form of nylon washers, locking washers, distorted thread nuts, serrated face nuts, or other locking nut/washer combinations. In some embodiments, Spiralock® thread forms by Stanley® Engineering Fastening can be used.

The tibia stem component and/or the tibia tray component in the various embodiments of the prosthesis disclosed herein can be made of any total joint material of materials commonly used in the prosthetic art, including, but not limited to, metals, ceramics, titanium, titanium alloys, tantalum, chrome cobalt, surgical steel, polyethylene, absorbable polymer, or any other total joint replacement metal and/or ceramic. In some embodiments, the tibia stem component and/or the tibia tray component can comprise a coating of 3D printed Biofoam™, Adaptis™ porous metal, sintered glass, artificial bone, any uncemented metal or ceramic surface, or a combination thereof that would promote bony in-growth. The tibia stem component and/or the tibia tray component can further be covered with one or more coatings such as antimicrobial, antithrombotic, and osteoinductive agents, or a combination thereof. In embodiments where the above-mentioned porous coating is provided, these agents can further be carried in a biodegradable carrier material with which the pores in the porous coating can be impregnated.

Although the examples of the inventive structures illustrated herein are exemplified as tibia stem and tray components of an ankle replacement prosthesis, the inventive structures are equally applicable in other physical joints in human or animal skeleton.

It will be understood that the foregoing description is of exemplary embodiments of this invention, and that the invention is not limited to the specific forms shown. Modifications may be made in the design and arrangement of the elements without departing from the scope of the invention.

What is claimed is:

1. An ankle prosthesis, comprising:
   a tibia stem component comprising a leading end, a trailing end, and an internal cavity defined along a longitudinal axis defined therethrough; and
   a tibia tray component configured to be attached to a prosthetic joint articulating surface,
      wherein the tibia tray component extends from the trailing end of the tibia stem component,
      wherein the tibia stem component is sized and configured to be disposed in an intramedullary canal formed in a tibia,
      wherein the tibia stem component comprises:
      one or more retractable members, each having a proximal end and a distal end, the proximal end being hingeably attached to a linear actuator provided within the internal cavity, and the distal end being a free end, so as to be controllably movable between a retracted position with the distal end located within the tibia stem and an outwardly extended position such that the distal end is spaced away from the longitudinal axis,
      wherein when the tibia stem component is disposed in the intramedullary canal and the one or more retractable members are extended outwardly, the distal ends of the one or more retractable members are configured so as to engage the intramedullary canal's surrounding bone and enhance anchoring the tibia stem within the intramedullary canal.

2. The prosthesis of claim 1, wherein the one or more retractable members are configured to be able to controllably moved back to the retracted position from being extended.

3. The prosthesis of claim 1, wherein the tibia tray comprises a channel extending between a pair of opposed rails for receiving the prosthetic joint surface.

4. The prosthesis of claim 3, wherein the channel in the tibia tray extends in an anterior-posterior direction, medial-lateral direction, or in an oblique direction.

5. The prosthesis of claim 1, wherein the tibia stem component comprises:
   an elongated generally cylindrical shell defining an internal cavity therein that is open at the trailing end; and
   an opening provided in the cylindrical shell of the tibia stem component for each of the one or more retractable members, through which the one or more retractable members move from the retracted position and extend outward.

6. The prosthesis of claim 5, wherein the tibia stem component further comprises a linear actuator provided within the internal cavity, the linear actuator being configured to be movable within the internal cavity along the longitudinal axis,
   wherein each of the one or more retractable members have a distal end and a proximal end, the proximal end being attached to the linear actuator and the distal end being a free end that is movable through the opening provided in the cylindrical shell of the tibia stem component is configured so as to engage the intramedullary canal's surrounding bone,
   whereby the one or more retractable members can be moved from the retracted position and extended outward and away from the tibia stem component by moving the linear actuator within the internal cavity.

7. The prosthesis of claim 6, wherein the one or more retractable members can be controllably moved back to the retracted position from being extended by moving the linear actuator within the internal cavity.

8. The prosthesis of claim 6, wherein the proximal end of each of the one or more retractable members is hingeably attached to the linear actuator.

9. An ankle prosthesis, comprising:
   a tibia stem component including a leading end, a trailing end, and a longitudinal axis defined therethrough with an elongated generally cylindrical shell defining an internal cavity therein that is open at the trailing end and includes one or more openings; and
   a tibia tray component configured to be attached to a prosthetic joint articulating surface,
      wherein the tibia tray component extends from the trailing end of the tibia stem component,
      wherein the tibia stem component is sized and configured to be disposed in an intramedullary canal formed in a tibia,
      wherein the tibia stem component comprises:
      one or more retractable members configured to be controllably movable from a retracted position and be extended outward and away from the longitudinal axis through the one or more openings defined in the cylindrical shell and through which the one or more retractable members move from the retracted position and extend outward,
      wherein in the retracted position, the one or more retractable members are contained substantially within the tibia stem component and do not extend outward,
      wherein when the tibia stem component is disposed in the intramedullary canal and the one or more retractable members are extended outward, the one or more retractable members engage the intramedullary canal's surrounding bone and enhance anchoring the tibia stem within the intramedullary canal and further comprises a linear actuator provided within the internal cavity, the linear actuator being configured to be movable within the internal cavity along the longitudinal axis,
      wherein each of the one or more retractable members have a distal end and a proximal end, the proximal end being attached to the linear actuator and the distal end being a free end that is movable through the opening provided in the cylindrical shell of the tibia stem component to engage the intramedullary canal's surrounding bone,
      whereby the one or more retractable members can be moved from the retracted position and extended outward and away from the tibia stem component by moving the linear actuator within the internal cavity;
      wherein the linear actuator comprises a base piece and a moving piece,
      wherein the base piece is positioned in the internal cavity and is configured to be rotated about the longitudinal axis but stationary so that it does not move in axial direction within the internal cavity, and the moving piece is movable along the longitudinal axis of the tibia stem with respect to the base piece,
      wherein the base piece and the moving piece threadedly engage each other for moving the threaded stem within the internal cavity.

10. The prosthesis of claim 9, wherein the base piece is positioned in the internal cavity near the trailing end.

11. The prosthesis of claim 9, wherein the movement of the moving piece toward the leading end of the tibia stem enables the one or more retractable members to move outward and away from the longitudinal axis.

12. The prosthesis of claim 3, wherein each of the one or more retractable members have a distal end and a proximal end, the proximal end being attached to the generally cylindrical shell of the tibia stem component, and the distal end being a free end is configured so as to engage the intramedullary canal's surrounding bone.

13. The prosthesis of claim 12, wherein the one or more retractable members are movable from the retracted position and extended outward by engaging the proximal ends of the one or more retractable members with an actuator inserted into the internal cavity via the opening at the trailing end of the tibia stem.

14. The prosthesis of claim 13, wherein the proximal end of each of the one or more retractable members comprises a cam surface and the actuator engages the cam surface to move the one or more retractable members from the retracted position and extended outward.

15. The prosthesis of claim 5, wherein the tibia stem component further comprises a linear actuator provided within the internal cavity, the linear actuator being configured to be movable within the internal cavity along the longitudinal axis,
wherein each of the one or more retractable members have a distal end and a proximal end, the proximal end being attached to tibia stem component and the distal end being a free end is configured so as to engage the intramedullary canal's surrounding bone,
whereby the one or more retractable members are moved from the retracted position and extended outward by translating the linear actuator within the internal cavity.

16. The prosthesis of claim 15, wherein the translation of the linear actuator toward the leading end of the tibia stem component enables the one or more retractable members to move outward and away from the longitudinal axis.

17. The prosthesis of claim 15, wherein the linear actuator and the internal cavity's sidewall engage each other for moving the linear actuator within the internal cavity.

18. The prosthesis of claim 17, wherein the linear actuator and the internal cavity's sidewall threadedly engage each other.

19. The prosthesis of claim 17, wherein the linear actuator and the internal cavity's sidewall engage each other for translating the linear actuator within the internal cavity.

20. The prosthesis of claim 19, wherein the linear actuator and the internal cavity's sidewall threadedly engage each other.

21. The prosthesis of claim 20, wherein the translation of the linear actuator toward the leading end of the tibia stem enables the one or more retractable members to move outward and away from the longitudinal axis.

22. The prosthesis of claim 17, wherein the linear actuator comprises a leading end and a trailing end corresponding with the direction of the tibia stem's leading end and trailing end, and the linear actuator further comprises a cam engaging surface near its leading end, and each of the proximal ends of the two or more retractable members comprises a cam surface that engages the cam engaging surface that enables the one or more retractable members to move outward and away from the longitudinal axis when the linear actuator translates toward the leading end of the tibia stem component.

23. The prosthesis of claim 5, wherein the distal ends of the one or more retractable members extend toward the trailing end of the tibia stem component when in the retracted position.

24. The prosthesis of claim 15, wherein the distal ends of the one or more retractable members extend toward the leading end of the tibia stem component when in the retracted position.

25. The prosthesis of claim 5, wherein the tibia stem component further comprises a linear actuator provided within the internal cavity, the linear actuator being configured to be movable within the internal cavity along the longitudinal axis,
wherein the one or more retractable members are moved from the retracted position and extended outward and away from the longitudinal axis by translating the linear actuator within the internal cavity.

26. The prosthesis of claim 25, wherein the linear actuator and the internal cavity's sidewall threadedly engage each other for moving the linear actuator within the internal cavity.

27. The prosthesis of claim 26, wherein the translation of the linear actuator toward the leading end of the tibia stem component enables the one or more retractable members to extend outward.

28. The prosthesis of claim 27, wherein the linear actuator comprises a leading end and a trailing end corresponding with the direction of the tibia stem's leading end and trailing end, and further comprises a cam engaging surface near its leading end,
wherein each of the one or more retractable members comprises a distal surface and a proximal surface with respect to the longitudinal axis of the tibia stem,
wherein the proximal surface of each of the one or more retractable members comprises a cam surface that engages the cam engaging surface of the linear actuator that enables the one or more retractable members to be pushed outward and away from the longitudinal axis when the linear actuator translates toward the leading end of the tibia stem component.

29. The prosthesis of claim 28, wherein the distal surface of each of the one or more retractable members comprise a plurality of surface features that are configured to engage the intramedullary canal's surrounding bone and enhance anchoring the tibia stem component within the intramedullary canal.

30. The prosthesis of claim 29, wherein the plurality of surface features on the distal surface are teeth having a biased orientation.

31. The prosthesis of claim 1, wherein the tibia stem component further comprises an actuator provided within the internal cavity, the actuator being configured to be rotatable about the longitudinal axis within the internal cavity,
wherein each of the one or more retractable members have a distal end and a proximal end, the proximal end being attached to tibia stem component and the distal end being a free end is configured so as to engage the intramedullary canal's surrounding bone,
whereby the one or more retractable members are moved from the retracted position and extended outward by rotating the actuator within the internal cavity.

32. The prosthesis of claim 31, wherein the actuator comprises a leadscrew portion and the proximal end of each of the one or more retractable members comprises a toothed gear portion that is engaged with the leadscrew portion, whereby rotating the actuator engages the leadscrew and the toothed gear portion for moving the one or more retractable members from the retracted position.

* * * * *